United States Patent
Widenbrant et al.

(10) Patent No.: US 12,024,659 B2
(45) Date of Patent: Jul. 2, 2024

(54) ADHESIVE SEAL

(71) Applicant: 3M INNOVATIVE PROPERTIES COMPANY, St. Paul, MN (US)

(72) Inventors: Martin J. O. Widenbrant, Stillwater, MN (US); Taylor M. Seabough, Palo Alto, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 447 days.

(21) Appl. No.: 16/617,938

(22) PCT Filed: May 30, 2018

(86) PCT No.: PCT/IB2018/053853
§ 371 (c)(1),
(2) Date: Nov. 27, 2019

(87) PCT Pub. No.: WO2018/220555
PCT Pub. Date: Dec. 6, 2018

(65) Prior Publication Data
US 2020/0102482 A1    Apr. 2, 2020

Related U.S. Application Data

(60) Provisional application No. 62/514,382, filed on Jun. 2, 2017.

(51) Int. Cl.
*C09J 7/38* (2018.01)
*C09J 7/40* (2018.01)
*F16L 5/10* (2006.01)

(52) U.S. Cl.
CPC .............. *C09J 7/403* (2018.01); *C09J 7/38* (2018.01); *C09J 7/405* (2018.01); *F16L 5/10* (2013.01); *C09J 2423/045* (2013.01); *Y10T 428/14* (2015.01); *Y10T 428/1471* (2015.01); *Y10T 428/1476* (2015.01); *Y10T 428/15* (2015.01)

(58) Field of Classification Search
None
See application file for complete search history.

(56) References Cited

U.S. PATENT DOCUMENTS

| | | | | |
|---|---|---|---|---|
| 6,105,579 A * | 8/2000 | Levitt | ..................... | A61B 46/00 128/853 |
| 6,238,762 B1 * | 5/2001 | Friedland | ................... | C09J 7/20 428/167 |
| 6,641,910 B1 * | 11/2003 | Bries | ........................ | C09J 7/403 428/56 |
| 7,682,675 B2 | 3/2010 | Boge | | |
| 7,740,928 B2 * | 6/2010 | Mehta | ........................ | C09J 7/22 428/80 |
| 8,998,214 B2 | 4/2015 | Kousaka | | |
| 10,422,447 B2 * | 9/2019 | Muenzenberger | ........ | F16L 5/02 |
| 2004/0028863 A1 * | 2/2004 | Shamer | ..................... | F16L 9/17 428/354 |
| 2005/0042403 A1 | 2/2005 | Boge | | |
| 2006/0240208 A1 * | 10/2006 | Ishikawa | .................. | C09J 7/241 428/40.1 |
| 2008/0124506 A1 | 5/2008 | Boge | | |
| 2013/0059105 A1 | 3/2013 | Wright | | |
| 2013/0075974 A1 | 3/2013 | Kousaka | | |
| 2013/0139953 A1 | 6/2013 | Galush | | |
| 2021/0285574 A1 * | 9/2021 | Guillette | ................. | B29C 33/00 |

FOREIGN PATENT DOCUMENTS

| | | |
|---|---|---|
| EP | 2375521 | 10/2011 |
| EP | 2397737 | 12/2011 |
| WO | WO 2003-035784 | 5/2003 |
| WO | WO 2011-148911 | 12/2011 |
| WO | WO 2015-088783 | 6/2015 |
| WO | WO 2017-031275 | 2/2017 |

OTHER PUBLICATIONS

Sieber Reto et al., "Sealing sleeve and system comprising the sealing sleeve and a guide", machine translation of EP 2397737 A1, Dec. 21, 2011 (Year: 2011).*
"3M™ Self Adhered Air and Vapor Barrier Membrane 3015", 3M Company, [retrieved from the internet on Jan. 20, 2020], URL <https://www.youtube.com/watch?v=ChyiuPvMa20>, 2013, p. 1.
"Dupont™ Tyvek® Flexwrap™ NF", Product Data Sheet, Dupont, [retrieved from the internet on Jan. 20, 2020], URL <https://www.dupont.com/content/dam/dupont/amer/US/en/performance-building-solutions/public/documents/K-23673-1_FlexWrap_NF_Product_Data_Sheet.pdf>, 2020, pp. 1-2.
"Flexible Air Sealing Tape FAST UC 8045", Product Data Sheet, 3M Company, 2016, pp. 1-3.
International Search Report for PCT International Application No. PCT/IB2018/053853, dated Sep. 21, 2018, 5 pages.
"Flashing for Hose Bibs-QuckFlash": [retrieved from the internet on Jan. 20, 2020], URL < https://www.youtube.com/watch?v=evz30TGmCM4>, 2010, p. 1.

* cited by examiner

*Primary Examiner* — Anish P Desai
(74) *Attorney, Agent, or Firm* — Kathleen B. Gross

(57) ABSTRACT

Adhesive seals include an elastic sealing sheet, an adhesive layer, and a release sheet on the adhesive layer.

20 Claims, 11 Drawing Sheets

ADHESIVE SEAL

CROSS REFERENCE TO RELATED APPLICATIONS

This application is a national stage filing under 35 U.S.C. 371 of PCT/IB2018/053853, filed May 30, 2018, which claims the benefit of U.S. Provisional Application No. 62/514,482, filed Jun. 2, 2017, the disclosure of which is incorporated by reference in its/their entirety herein.

BACKGROUND

Various building materials and construction techniques have been used to seal air leaks in buildings to conserve energy and to reduce or prevent moisture and air leaks. For example, various techniques have been used in an attempt to limit air and moisture leakage through openings or gaps in interior and/or exterior walls of buildings. Penetrations to accommodate pipes, conduits, and recessed lights are examples of sources of leaks. Prior techniques to reduce leaks have included the use of insulated covers, caulk, foams, and adhesive seals that require the user to make cuts, pleats, folds, and/or seams on the seal in order to apply the seal. Improvements to the seals are desired.

SUMMARY

The present disclosure relates to adhesive seals. The adhesive seals can be used to seal a gap between a flat surface, such as a wall, and a feature such as a pipe, a conduit, a recessed light, or other protrusion penetrating through the flat surface.

In one embodiment, an adhesive seal is provided that includes an elastic sealing sheet having a first major surface and a second major surface separated by a thickness; an adhesive layer on the first major surface; a release sheet on the adhesive layer, the release sheet defining a single sheet covering at least 90% of the surface area of the adhesive layer such that the adhesive layer is positioned between the elastic sealing sheet and the release sheet; and a through hole extending through the thickness of the elastic sealing sheet, the adhesive layer, and the release sheet. In certain embodiments, the release sheet may exhibit a tensile elongation of at least 50% and/or up to 1000%. In certain embodiments, the release sheet comprises polyolefins, elastomers, acrylic or methacrylic mono-polymers or co-polymers, co-polyesters, synthetic and natural rubbers, polyurethanes, or combinations thereof.

In another embodiment, an adhesive seal is provided that includes an elastic sealing sheet having a first major surface and a second major surface separated by a thickness; an adhesive layer on the first major surface; a through hole extending through the thickness of the elastic sealing sheet and the adhesive layer, the through hole comprising a perimeter; and a release sheet comprising a plurality of sheet sections arranged to cover at least 90% of the surface area of the adhesive layer such that the adhesive layer is positioned between the elastic sealing sheet and the release sheet, at least two of the sheet sections comprising an edge intersecting the perimeter of the through hole. In certain embodiments, the release sheet may exhibit a tensile elongation of at least 50% and/or up to 1000%. In certain embodiments, the release sheet comprises polyolefins, elastomers, acrylic or methacrylic mono-polymers or co-polymers, co-polyesters, synthetic and natural rubbers, polyurethanes, or combinations thereof.

In another embodiment, an adhesive seal is provided that includes an elastic sealing sheet having a first major surface and a second major surface separated by a thickness; an adhesive layer on the first major surface; a through hole extending through the thickness of the elastic sealing sheet and the adhesive layer, the through hole comprising a perimeter; and a release sheet comprising a plurality of overlapping sheet sections arranged to cover at least 90% of the surface area of the adhesive layer such that the adhesive layer is positioned between the elastic sealing sheet and the release sheet, the release sheet defining one or more overlap portions intersecting the perimeter of the through hole. In certain embodiments, the release sheet may exhibit a tensile elongation of 0% or higher and/or up to 1000%. In certain embodiments, the release sheet comprises polyolefins, elastomers, acrylic or methacrylic mono-polymers or co-polymers, co-polyesters, synthetic and natural rubbers, polyurethanes, polyesters, polymer-coated Kraft papers, siliconized Kraft papers, high density polyethylenes, polypropylenes, or combinations thereof.

In another embodiment, an adhesive seal is provided that includes an elastic sealing sheet having a first major surface and a second major surface separated by a thickness; an adhesive layer on the first major surface; a through hole extending through the thickness of the elastic sealing sheet and the adhesive layer, the elastic sealing sheet having an inner portion surrounding the through hole and an outer portion extending radially from the inner portion; and a first release sheet defining an expandable contracted surface covering the adhesive layer of the inner portion. The adhesive seal may also include a second release sheet covering the adhesive layer of the outer portion. In certain embodiments, the first release sheet comprises polyolefins, elastomers, acrylic or methacrylic mono-polymers or co-polymers, co-polyesters, synthetic and natural rubbers, polyurethanes, polyesters, polymer-coated Kraft papers, siliconized Kraft papers, high density polyethylenes, polypropylenes, and combinations thereof.

In some embodiments, an adhesive seal is provided that includes an elastic sealing sheet having a first major surface and a second major surface separated by a thickness; an adhesive layer on the first major surface; and a release sheet on the adhesive layer, the release sheet defining a single sheet covering at least 90% of the surface area of the adhesive layer such that the adhesive layer is positioned between the elastic sealing sheet and the release sheet, the single sheet comprising a line of separation extending from a central portion of the single sheet to a perimeter of the single sheet, the release sheet exhibiting a tensile elongation from 50% to 1000%. In some embodiments, the adhesive seal is provided in roll-form.

In some embodiments, an adhesive seal is provided that includes an elastic sealing sheet having a first major surface and a second major surface separated by a thickness; an adhesive layer on the first major surface; and a release sheet comprising a plurality of overlapping sheet sections arranged to cover at least 90% of the surface area of the adhesive layer such that the adhesive layer is positioned between the elastic sealing sheet and the release sheet, the release sheet defining one or more overlap portions. In some embodiments, the adhesive seal is provided in roll-form.

The terms "polymer" and "polymeric material" include, but are not limited to, organic homopolymers, copolymers, such as for example, block (e.g., diblock, triblock), graft, random and alternating copolymers, and blends and modifications thereof. Furthermore, unless otherwise specifically limited, the term "polymer" shall include all possible geometrical configurations of the material. These configurations include, but are not limited to, isotactic, syndiotactic, and atactic symmetries. Furthermore, unless otherwise specifically limited, the term "copolymer" shall include polymers made of two or more different types of monomers, including terpolymers, tetrapolymers, etc.

The terms "intersect" and "intersection" are used here to refer to a situation where two or more objects, such as lines, curves, planes, or surfaces, share a point, line, or curve in common.

The term "edge" with regard to a sheet is used here to refer to an outside edge at a perimeter of a sheet, or the perimeter of a through hole in the sheet.

The term "line of separation" is used here to refer to a portion of a material (e.g., a sheet) that is weakened such that the material preferentially separates along the line. A line of separation may include, for example, a line of perforation, a score, a thinning of the material, or a cut.

The term "minor cross dimension" is used here to refer to the smallest cross dimension of an object, the smallest cross dimension being the shortest length that passes through the center of the object in the plane where the cross dimension is being measured.

The term "major cross dimension" is used here to refer to a dimension of the object that is perpendicular to the minor cross dimension and in the same plane as the minor cross dimension.

The terms "rest" and "rest position" are used here to refer to a state where the object has not been and is not being stretched from its original state.

The term "tensile elongation" is used here to refer to the percentage increase in length (elongation) of a material under stress (tension) before the material breaks.

The term "tensile strength" is used here to refer to the capacity of a material to withstand a pulling (tensile) force before the material breaks, tears, rips, etc.

As used here, the term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used here, the term "or" is generally employed in its usual sense including "and/or" unless the content clearly dictates otherwise. The term "and/or" means one or all of the listed elements or a combination of any two or more of the listed elements.

As used here, all numbers are assumed to be modified by the term "about" and in certain situations, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

As used here, the recitations of numerical ranges by endpoints include all numbers subsumed within that range as well as the endpoints (e.g., 1 to 5 includes 1, 1.5, 2, 2.75, 3, 3.80, 4, 5, etc.).

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

BRIEF DESCRIPTION OF DRAWINGS

FIG. 1b is a side view of the adhesive seal of FIG. 1a.

DETAILED DESCRIPTION

The present disclosure relates to adhesive seals. The adhesive seals of the present disclosure provide an easy-to-install and effective seal that can be used to seal a gap between a surface, such as a wall, and a feature such as a pipe, a conduit, a recessed light, or other protrusion penetrating the surface. According to certain embodiments, the adhesive seals can be used to reduce air or moisture leaks and to reduce or prevent transfer between conditioned and non-conditioned spaces of buildings to conserve energy. The adhesive seals of the present disclosure can be used to seal leaks along interior and exterior walls (or other similar surfaces) where the wall includes a penetration to accommodate a pipe, a conduit, a recessed light, or another feature. The term "wall" is understood to mean not only vertical surfaces, but also horizontal, curved, and angled surfaces such as floors, ceilings, and roofs.

Sealing the joint between a wall and a member protruding through a hole in the wall can be difficult, particularly when taking into account movement of the building and pressure differentials across the building envelope. Common solutions, including caulks and backer rod, often fail over time due to their limited elasticity or elongation. Other methods, such as use of overlapping pieces of tape, are difficult to install without creating or leaving holes in the overlaps. The use of high elongation tapes suffers from the tendency of the tape to return to its rest state (a non-stretched state), thus undoing the seal and exposing the joint. Existing tapes can also be difficult to stretch enough to form a tight seal, particularly around protrusions with a small diameter. Improvements to the existing methods are desired.

Figure 1A:
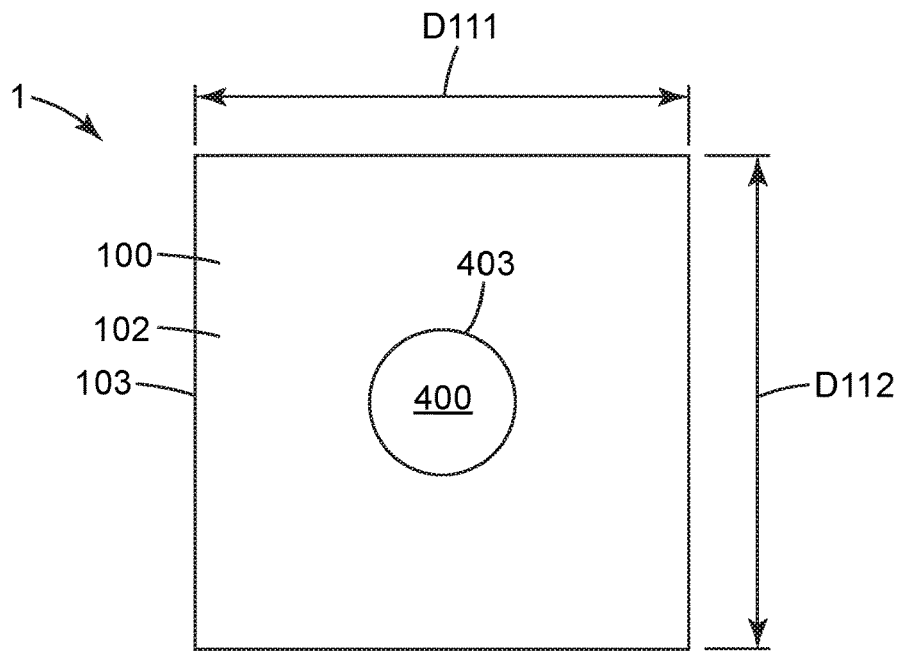
FIG. 1a is a top view of an adhesive seal according to an embodiment.
Figure 1B:
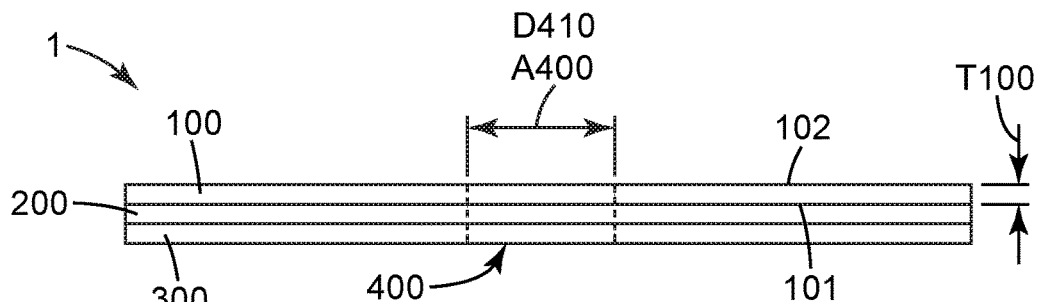

According to an embodiment shown, for example, in FIGS. 1a and 1b, the adhesive seal 1 includes an elastic sealing sheet 100 having a first major surface 101 and a second major surface 102 opposite of the first major surface 101, the first and second major surfaces 101, 102 separated by a thickness T100. The adhesive seal 1 includes an adhesive layer 200 disposed on the first major surface 101 of the elastic sealing sheet 100, and a release sheet 300 disposed on the adhesive layer 200. The release sheet 300 substantially covers the adhesive layer 200 such that the adhesive layer 200 is positioned between the elastic sealing sheet 100 and the release sheet 300. For example, the release sheet 300 may cover at least 90% of the surface are of the adhesive layer. The side of the adhesive seal with the adhesive and the release sheet is also referred to here as the backside or bottom, and the opposite side as the frontside or top. The adhesive seal 1 may further include a through hole 400 extending through the thickness T100 of the elastic sealing sheet 100, the adhesive layer 200, and the release sheet 300. Alternatively, the adhesive seal 1 may be provided without a through hole such that the user of the adhesive seal 1 can cut a through hole of a desired size and location (e.g., centered or off center) on the adhesive seal 1.

The adhesive seals of the present disclosure can be used to seal around a penetrating feature on a wall, ceiling, foundation wall, roof, or other surface. For simplicity, the penetrating feature is generally referred to as a protrusion here, and the surface is referred to as a wall, although use of the adhesive seal on many other features and surfaces is also possible. The through hole of the adhesive seal is selected to be smaller than the protrusion. For example, the through hole may have a perimeter that is smaller than the perimeter of the protrusion. If the through hole is circular and the protrusion has a circular cross section, the circumference of the through hole may be smaller than the circumference of the protrusion.

The adhesive seal is applied by positioning the through hole over the protrusion with the backside of the adhesive seal with the release sheet facing the wall, and pushing the adhesive seal against the protrusion so that the protrusion stretches and deforms the material of the elastic sealing sheet until the through hole is expanded enough to slip over the protrusion. The adhesive seal is further pushed along the protrusion until the outer portion of the adhesive seal comes into contact with the wall and the adhesive seal extends from covering the wall surrounding the protrusion to covering a length of the protrusion extending outwardly from the wall, and therefore also covering gaps between the wall and the protrusion. The release sheet can then be removed to allow the adhesive to adhere the elastic sealing sheet to the wall and the protrusion.

In certain embodiments, the adhesive seal exhibits an insertion force of greater than 0 N (zero pounds) and less than 133 N (less than 30 pounds), less than 267 N (less than 60 pounds), or less than 445 N (less than 100 pounds), when the protrusion is pushed through the through hole of the adhesive seal. The elastic sealing sheet may exhibit a tensile elongation of at least 50%, at least 100%, at least 500%, or at least 800%. The tensile elongation of the elastic sealing sheet may be up to 100%, up to 500%, up to 800%, or up to 1000%. The elastic sealing sheet may exhibit a tensile strength of at least 0.1 MPa, at least 0.2 MPa, at least 1 MPa, at least 5 MPa, at least 10 MPa, or at least 15 MPa. The tensile strength of the elastic sealing sheet may be up to 5 MPa, up to 10 MPa, up to 15 MPa, up to 20 MPa, up to 25 MPa, up to 50 MPa, up to 100 MPa, or up to 200 MPa.

The elastic sealing sheet 100 may be made from any suitable material that has the requisite characteristics, including the insertion force and tensile elongation discussed above, and the ability to seal a gap. It is desirable that, outside of any through hole, the elastic sealing sheet 100 exhibit an air leakage of 0.004 cubic feet per minute per square foot (i.e., cfm/ft$^2$) (0.02 L/s·m$^2$) or less when tested at 1.57 pounds-force per square foot (i.e., psf) (75 Pa) according to ASTM E2178, and that the sealed gap exhibit an air leakage of 0.04 cfm/ft$^2$ (0.2 L/s·m$^2$) or less after the elastic sealing sheet has been installed when tested at 1.57 psf (75 Pa) according to ASTM E2357, E1677, E1680, or E283.

Suitable materials for the elastic sealing sheet include, for example, acrylic or methacrylic mono-polymers or co-polymers, acrylic foams, polyurethanes, natural rubbers, synthetic rubbers (e.g., butyl rubber and ethylene propylene diene monomer "EPDM"), linear and radial styrene block copolymers (such as styrenebutadiene, styrene-ethylene/butylene and styrene-isoprene), polyvinyl ethers, asphaltics, silicones, linear or branched polyolefins (such as olefin block copolymers, low density polyethylenes "LDPE", polypropylenes, etc.), polyamides, polystyrenes, polystyrene-butadienes, nylons, polyesters, polyester copolymers, polysulfones, polyvinylidene chlorides, styrene-maleic anhydride copolymers, styrene acrylonitrile copolymers, ionomers based on sodium or zinc salts of ethylene methacrylic acid, polymethylmethacrylates, cellulosics, fluoroplastics, polycarbonates, polyacrylonitriles, ethylene-vinyl acetate copolymers, silyl-terminated polymers (such as silyl terminated polyethers, "STPE"), coated woven or non-woven fabrics, and combinations thereof. The elastic sealing sheet 100 may include a plurality of layers, coatings, or combinations thereof, such that the first major surface 101 is formed by one or more of the layers or coatings. Exemplary sealing sheets are disclosed in US 2013/0139953 (Galush et al.) and WO 2017/031275 (Widenbrant et al.). One example of a suitable, commercially available sealing material is the Flexible Air Sealing Tape ("FAST"), product number UC8045 available from 3M Company in St Paul, Minn.

In certain embodiments, the elastic sealing sheet 100 may have a thickness T100 of at least 0.050 mm, at least 0.10 mm, at least 0.25 mm, at least 0.50 mm, at least 0.74 mm, or at least 1.0 mm. The elastic sealing sheet may have a thickness of up to 0.50 mm, up to 1.25 mm, up to 1.50 mm, up to 2.0 mm, or up to 2.5 mm. In one exemplary embodiment, the elastic sealing sheet 100 is made from acrylic tape and has a thickness T100 of about 1.0 mm.

Figure 7A:
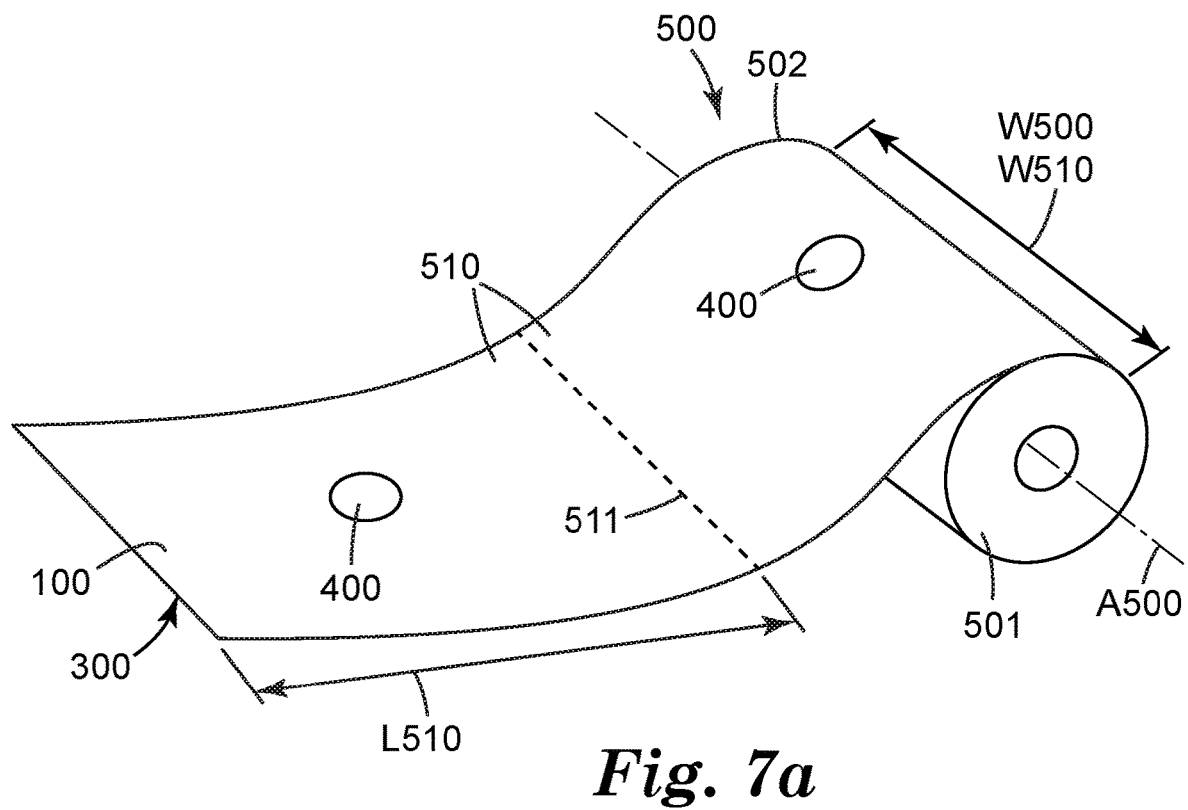
FIG. 7a is a perspective view of an adhesive seal roll according to an embodiment.

The elastic sealing sheet may have any suitable shape, such as quadrilateral, square, rectangular, round, oval, ovoid, triangular, polygonal, rounded polygonal, or an irregular shape. In some embodiments, the adhesive seal is provided in roll-form, as shown in FIG. 7a.

The adhesive seal 1 may include a through hole, or may alternatively be provided without a through hole such that the user of the adhesive seal 1 can cut a through hole of a desired size. If the adhesive seal 1 is provided in roll-form, the rolled adhesive seal material may include a plurality of pre-cut through holes at a repeating interval. The size of the through hole is preferably selected such that the through hole is smaller than the cross dimension of the protrusion intended to be sealed by the adhesive seal.

Figure 1C:
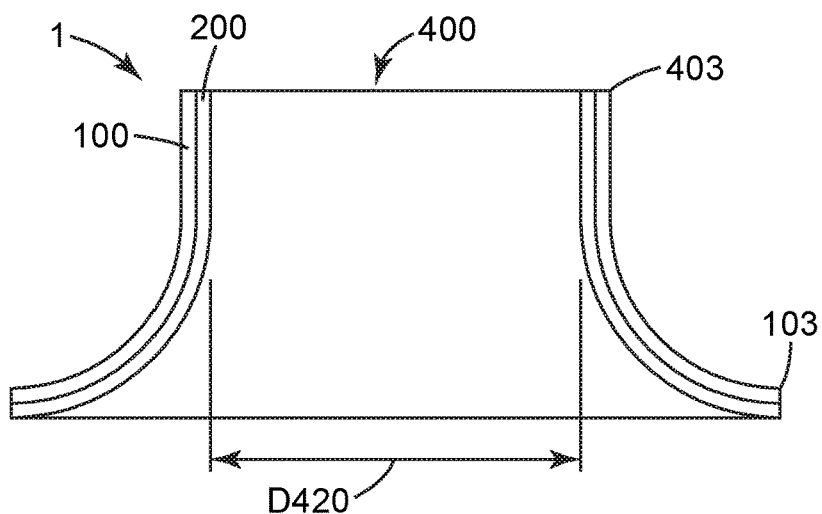
FIG. 1c is a cross sectional side view of the adhesive seal of FIG. 1a in a stretched configuration.

Before the adhesive seal 1 is installed or stretched, the adhesive seal 1 is in a rest configuration, and the through hole 400 has a rest cross dimension D410 along an axis A400, as shown in FIG. 1b. After the adhesive seal 1 is stretched (e.g., after installation), as shown in FIG. 1c (adhesive seal shown without the release sheet), the adhesive seal 1 surrounding the through hole 400 is in a stretched configuration, and the through hole 400 has a stretched cross dimension D420 along the axis A400. The adhesive seals of the present disclosure can be particularly useful for sealing around protrusions of varying diameters, including protrusions with very small radius of curvature or irregular (e.g., non-circular) shape. In some embodiments, the stretched cross dimension D420 is at least 25% greater, at least 50% greater, at least 100% greater, or at least 150% greater than the rest cross dimension D410. The stretched cross dimension D420 may be up to 1000% greater, up to 500% greater, up to 400% greater, up to 300% greater, up to 200% greater, or up to 100% greater, than the rest cross dimension D410.

The size of the through hole 400 is also preferably selected such that a sufficient width of the elastic sealing sheet surrounds the through hole on all sides. For example, the elastic sealing sheet may have a minor cross dimension D111 (measured in the plane of the first or second major surface) of at least 25 mm, at least 100 mm, at least 150 mm, or at least 200 mm, and up to 200 mm, 250 mm, 400 mm, 500 mm, or 750 mm, and a major cross dimension D112 that is the same or greater than the minor cross dimension. In certain embodiments, the through hole has a rest cross dimension that is at least 1%, at least 5%, or at least 10%, and up to 5%, up to 10%, up to 20%, up to 40%, up to 60%, up to 80%, or up to 90% of the minor cross dimension of the elastic sealing sheet.

In some embodiments, the through hole has a rest cross dimension of at least 3 mm, at least 5 mm, at least 10 mm, at least 20 mm, or at least 50 mm. The through hole may have a rest cross dimension of up to 300 mm, up to 250 mm, up to 200 mm, up to 150 mm, up to 100 mm, up to 75 mm, up to 50 mm, up to 40 mm, up to 30 mm, or up to 20 mm. The through hole 400 extending through the elastic sealing sheet 100 may also have a different size than the through hole extending through the release sheet 300. For example, the through hole extending through the release sheet 300 can be smaller than the through hole extending through the elastic sealing sheet 100. In some embodiments, the release sheet 300 does not have a through hole.

The through hole 400 is preferably at least 12.5 mm or at least 25 mm from the nearest outside edge of the adhesive seal 1. The through hole 400 may be centered on the adhesive seal 1, or may be positioned off center.

The through hole 400 may have any suitable shape, such as quadrilateral, square, rectangular, round, oval, ovoid, triangular, polygonal, rounded polygonal, or an irregular shape.

The adhesive layer 200 will preferably be such that when the adhesive seal is installed and the release sheet 300 is removed, the adhesive layer is capable of forming a seal with the wall and the protrusion. The adhesive layer 200 may cover the first major surface of the elastic sealing sheet 100 entirely, or may cover at least 90%, at least 95%, at least 98%, or at least 99% of the first major surface. In an alternative embodiment, the adhesive layer 200 includes one or more gaps.

In some embodiments, the adhesive layer 200 includes an adhesive that can form a seal with the wall and the protrusion and that can withstand a wide range of environmental conditions, such as exposure to water and high and low temperatures (e.g., from −50° C. to 65° C.). In some embodiments, the adhesive layer 200 includes a tacky, pressure sensitive adhesive. Suitable adhesives include pressure sensitive adhesives used to adhere air-barrier and water-barrier articles to architectural structures, such as buildings. Examples of suitable adhesives for the adhesive layer 200 include homopolymers and copolymers of butyl rubber, styrene-butadiene-styrenes (SBS), styrene-isoprene-styrenes (SIS), styrene butadieness (SB), styrene-ethylene-butadiene-styrenes (SEBS), ethylene/vinylacetates (EVA), (meth)acrylics, and combinations thereof. Examples of suitable (meth)acrylic homopolymers and copolymers include isooctyl acrylates, butyl acrylates, hexyl acrylates, and 2-ethylhexyl acrylates. In addition, polar co-monomers can be included, such as for example acrylic acid, itaconic acid, 2-carboxy ethyl acrylate, acrylamide and its substituted derivatives. Suitable adhesives also include asphalt-based adhesives, such as bitumen and natural-rubber-based adhesives.

Optional additives include tackifiers, pigments, fillers, UV stabilizers, flame retardants, thixotropic agents, viscosity modifiers, solvents, and the like. Resins, such as those of the hydrocarbon and rosin types, may be employed as tackifiers in hot melt adhesives. Other additives may include natural and petroleum waxes, oils, and bitumen.

The adhesive layer 200 may have a thickness of at least 0.001 inch (0.03 mm), at least 0.003 inch (0.08 mm), or at least 0.005 inch (0.1 mm). The thickness of the adhesive layer 200 may be up to 0.1 inch (2.5 mm), up to 0.025 inch (0.6 mm), or up to 0.02 inch (0.5 mm).

In order to facilitate installation of the adhesive seal 1, a release sheet 300 is arranged to cover the adhesive layer 200 and can be removed after the adhesive seal 1 is applied around the protrusion and over the gap intended to be sealed. As described in more detail below, in some embodiments the release sheet 300 is a single sheet and in some other embodiments, the release sheet 300 includes two or more distinct pieces or sections. The release sheet 300 can be arranged to cover at least 90%, at least 95%, at least 98%, or at least 99% of the surface area of the adhesive layer, or may cover the adhesive layer completely. The size and shape of the release sheet 300 may be the same or different from the elastic sealing sheet 100. For example, the release sheet may have a minor cross dimension D301 (see, e.g., FIG. 2) that may be the same as or different from the minor cross dimension D111 of the elastic sealing sheet, and/or a major cross dimension D302 (see, e.g., FIG. 2) that may be the same as or different from the major cross dimension D112 of the elastic sealing sheet. In certain embodiments, the release sheet 300 may extend past one or more edges 103 of the elastic sealing sheet 100 and the adhesive layer 200. For example, the release sheet 300 may extend to cover at least a portion of the through hole 400, or may extend past the outer edge 103 of the elastic sealing sheet to form a tab to facilitate handling.

Figure 2:
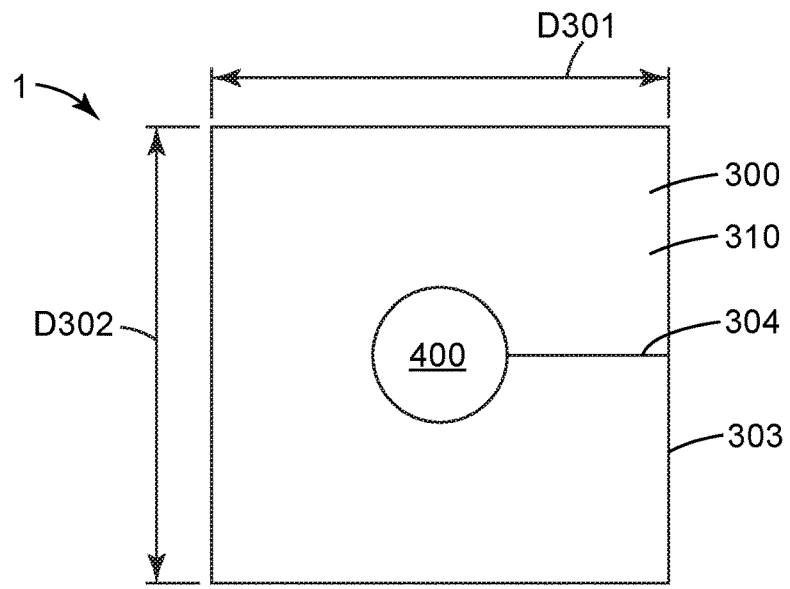
FIG. 2 is a bottom view of the adhesive seal of FIG. 1a according to an embodiment.

According to one embodiment, the release sheet 300 is a single sheet 310 that covers at least 90%, at least 95%, at least 98%, or 100% of the surface area of the adhesive layer such that the adhesive layer is positioned between the elastic sealing sheet and the release sheet. An example of an adhesive seal 1 with a single sheet 310 release sheet 300 is shown in FIG. 2.

Figure 3A:
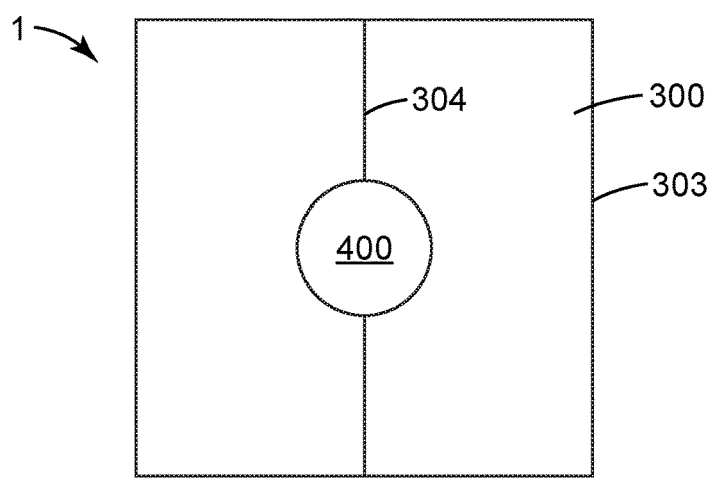
FIG. 3a is a bottom view of the adhesive seal of FIG. 1a according to an embodiment.
Figure 3B:
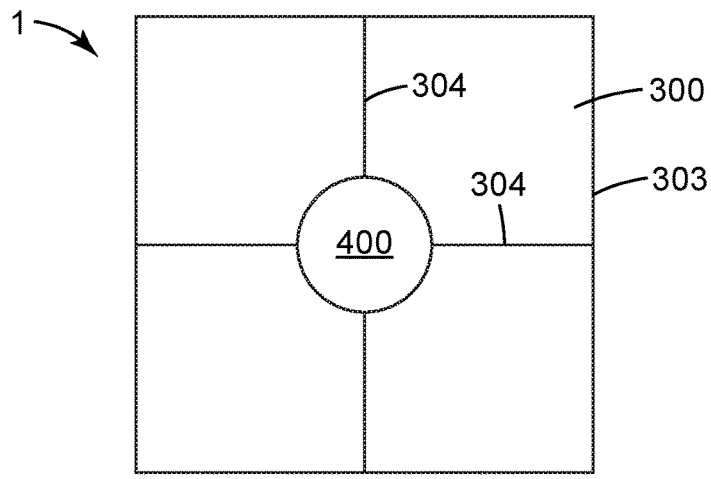
FIG. 3b is a bottom view of the adhesive seal of FIG. 1a according to an embodiment.

The release sheet 300 (e.g., the single sheet 310 or a plurality of sheet sections 320) may include one or more lines of separation 304. As shown in FIGS. 2, 3*a*, and 3*b*, the line of separation 304 may extend outwardly from the perimeter 403 of the through hole 400 and may extend to the outside edge 303 of the release sheet 300. The line of separation 304 can be used to facilitate removal of the release sheet 300 during installation of the adhesive seal 1.

The release sheet 300 can be made from any suitable material that can facilitate installation of the adhesive seal 1. Typical release sheet materials include various polymeric materials and coated papers.

According to some embodiments, and in particular certain embodiments where the release sheet 300 is provided as a single sheet 310 or a plurality of sheet sections 320 that are not arranged to overlap, the release sheet 300 may exhibit a tensile elongation that is similar to the tensile elongation of the elastic sealing sheet 100. For example, the tensile elongation of the release sheet 300 may be at least 50%, at least 100%, or at least 150%. The tensile elongation of the release sheet 300 may be up to 100%, up to 500%, up to 800%, or up to 1000%. The release sheet may also exhibit a tensile strength of at least 0.1 MPa, at least 0.5 MPa, at least 1 MPa, at least 1.2 MPa, at least 1.5 MPa, at least 2 MPa, at least 3 MPa, or at least 5 MPa. The tensile strength of the release sheet may be up to 2 MPa, up to 3 MPa, up to 5 MPa, up to 10 MPa, up to 25 MPa, up to 50 MPa, up to 100 MPa, or up to 200 MPa. Suitable materials for such release sheets include polyolefins (including metallocene-catalyzed olefins), elastomers, acrylic or methacrylic monopolymers or co-polymers, co-polyesters, synthetic and natural rubbers, polyurethanes, and combinations thereof. In one exemplary embodiment, the release sheet includes low density polyethylene or is made completely from low density polyethylene. Low density polyethylene may include polyethylenes with a density of 0.91 to 0.94 g/cm$^3$.

Figure 4A:
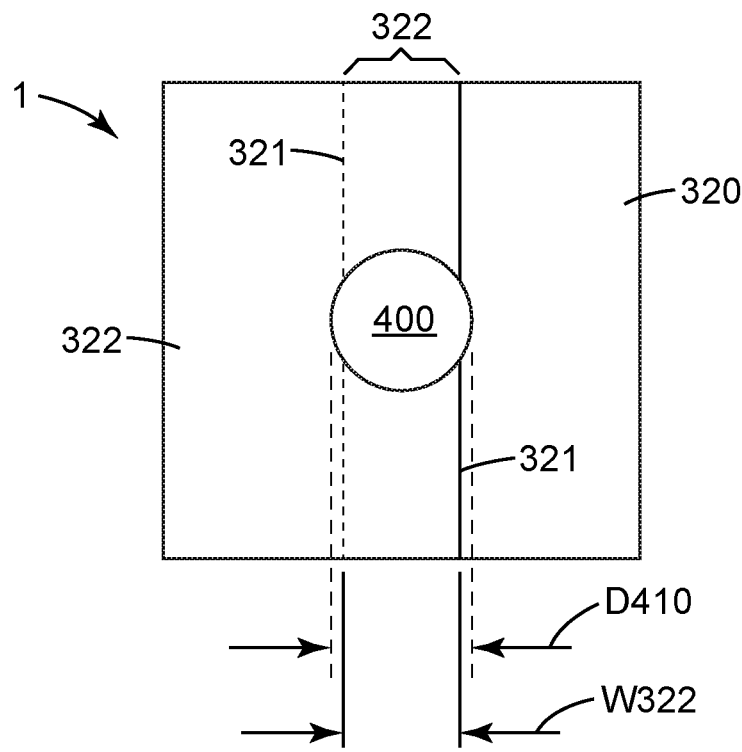
FIG. 4a is a bottom view of the adhesive seal of FIG. 1a according to an embodiment.

In certain embodiments, the release sheet 300 includes a plurality of sheet sections 320. The sheet sections 320 can be arranged to cover at least 90%, at least 95%, at least 98%, or 100% of the surface area of the adhesive layer 200 such that the adhesive layer 200 is positioned between the elastic sealing sheet 100 and the release sheet 300. As shown in FIG. 4*a*, the sheet sections 320 may be arranged so that at least two of the sheet sections 320 have an edge 321 that intersects the perimeter 403 of the through hole 400.

The number of sheet sections 320 can be any suitable number, such as 2, 3, 4, 5, etc., up to 20. In some embodiments, the number of sheet sections 320 is between 2 and 16. The sheet sections 320 may further include one or more lines of separation 304.

In some embodiments the sheet sections 320 of the release sheet 300 are arranged on the adhesive layer 200 so that the sheet sections 320 do not overlap.

Figure 4B:
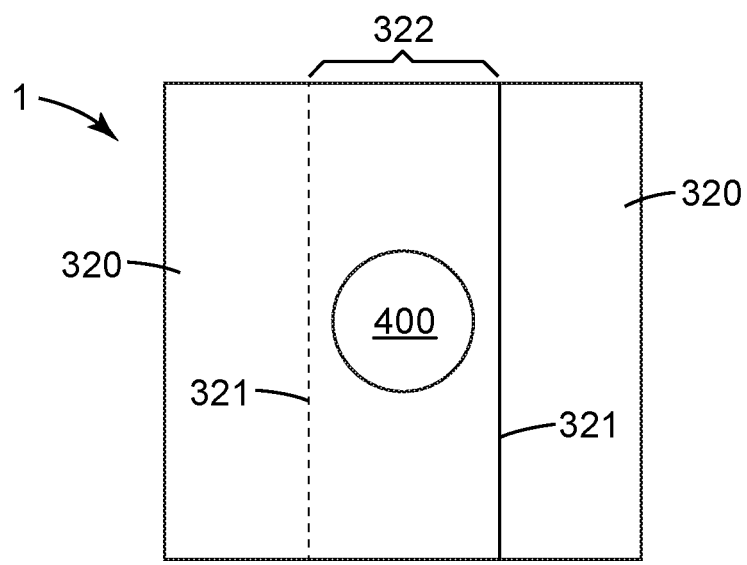
FIG. 4b is a bottom view of the adhesive seal of FIG. 1a according to an embodiment.

Referring now to FIGS. 4*a*, 4*b*, and 5*a*-5C, in some embodiments the sheet sections 320 are arranged on the adhesive layer 200 such that two or more of the sheet sections 320 overlap with one another, defining one or more overlap portions 322 of the sheet sections 320. In FIGS. 4*a* and 4*b*, the plurality of sheet sections 320 includes two sheet sections 320 that overlap. The overlapping portion 322 may intersect the through hole 400. In certain embodiments, the overlapping portion 322 has a width W322 that is narrower than the rest cross dimension D410 (e.g., diameter) of the through hole 400, as shown in FIG. 4*a*.

Figure 5A:
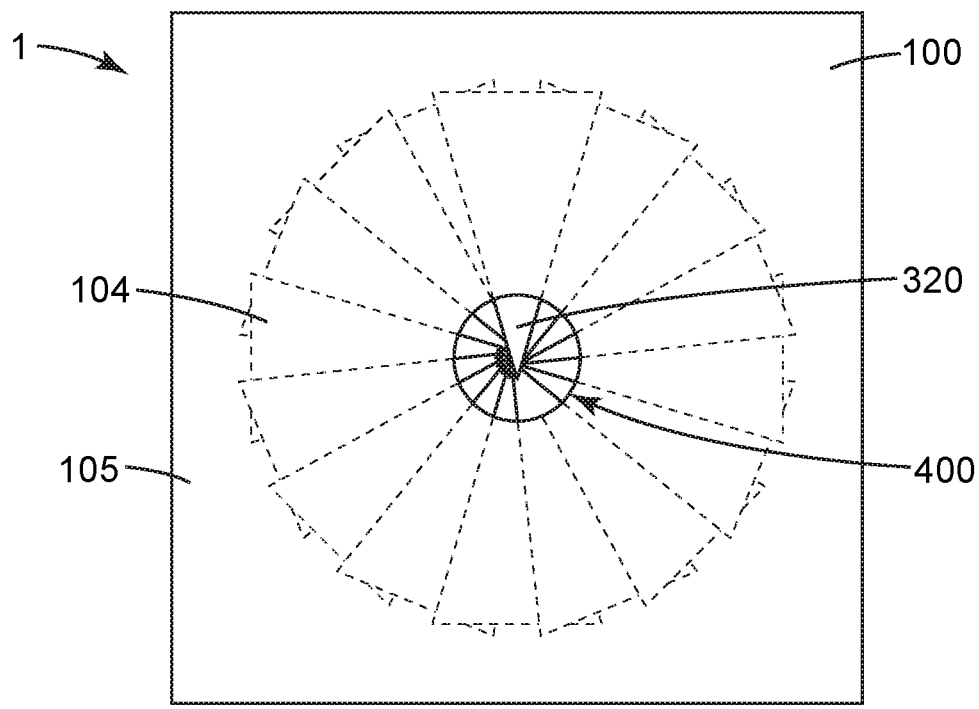
FIG. 5a is a top view of an adhesive seal according to an embodiment.
Figure 5B:
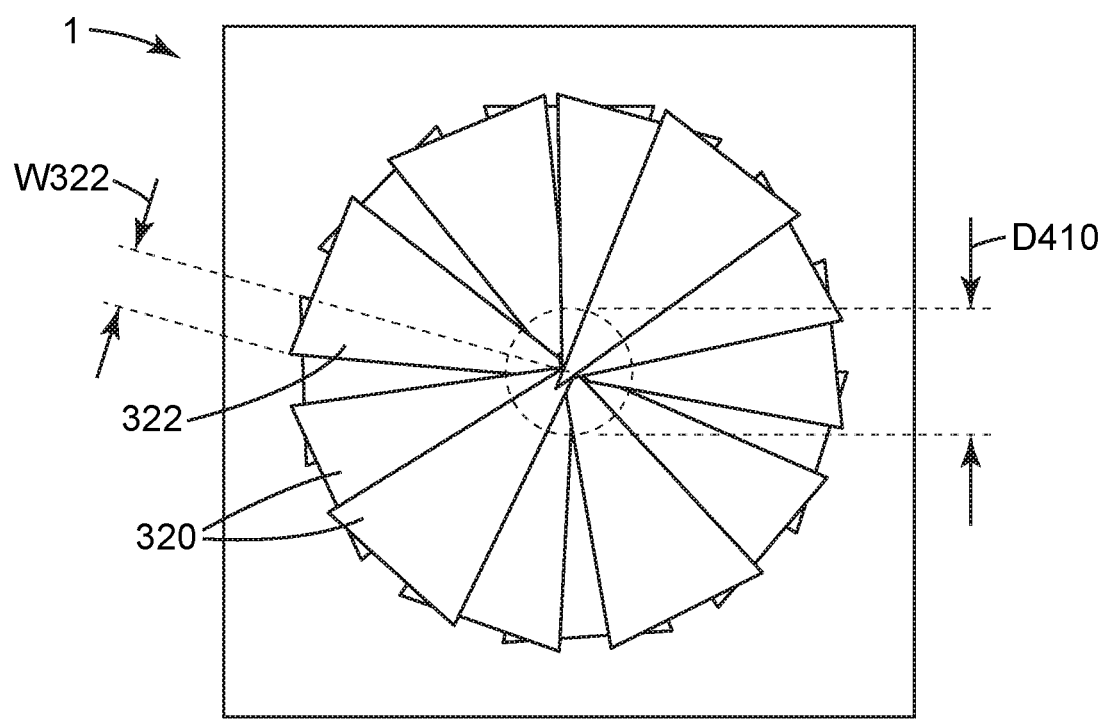
FIG. 5b is a bottom view of the adhesive seal of FIG. 5a according to an embodiment.
Figure 5C:
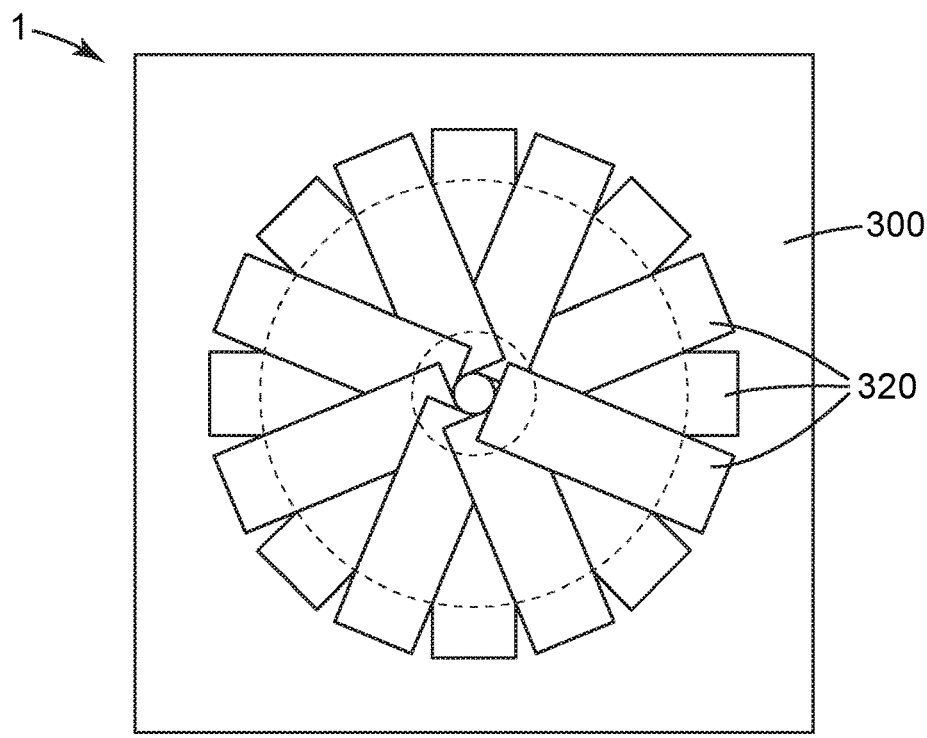
FIG. 5C is a bottom view of an adhesive seal according to an embodiment.

In embodiments where the release sheet 300 includes more than two sheet sections 320 and more than two overlap portions 322, the rest cross dimension D410 may be greater than the width W322 of any of the overlap portions 322, as shown in FIGS. 5*a*-5C.

According to some embodiments, and in particular certain embodiments where the release sheet 300 is provided as a plurality of sheet sections 320, the material of the release sheet 300 may exhibit a tensile elongation of 0% or higher, or at least 10%, at least 20%, at least 50%, at least 100%, at least 150%, at least 200%, or at least 500%. The tensile elongation of the release sheet 300 may be up to 100%, up to 500%, up to 800%, or up to 1000%. In certain embodiments where the release sheet 300 includes two or more sheet sections 320 that do not overlap, the material of the release sheet 300 may exhibit a tensile elongation of at least 50%, at least 100%, at least 150%, at least 200%, or at least 500%. The tensile elongation of the non-overlapping release sheet 300 may be up to 500%, up to 800%, or up to 1000%. The release sheet may also exhibit a tensile strength of at least 0.1 MPa, at least 0.5 MPa, at least 1 MPa, at least 1.2 MPa, at least 1.5 MPa, at least 2 MPa, at least 3 MPa, or at least 5 MPa. The tensile strength of the release sheet may be up to 2 MPa, up to 3 MPa, up to 5 MPa, up to 10 MPa, up to 25 MPa, up to 50 MPa, up to 100 MPa, or up to 200 MPa. Suitable materials for such release sheets include polyolefins (including metallocene-catalyzed olefins), elastomers, acrylic or methacrylic mono-polymers or co-polymers, co-polyesters, synthetic and natural rubbers, polyurethanes, and combinations thereof. In one exemplary embodiment, the release sheet includes low density polyethylene or is made completely from low density polyethylene.

FIGS. 5a-5C show exemplary embodiments of adhesive seals where the release sheet 300 includes a plurality of sheet sections 320 that are arranged to overlap, defining one or more overlap portions 322. The plurality of sheet sections 320 may all be the same shape and size, as in FIGS. 5b and 5C, or may include multiple shapes and/or sizes of sheet sections. At least some or all of the overlap portions 322 may intersect the perimeter 403 of the through hole 400. In certain embodiments, the overlap portions 322 have a width W322 that is narrower than the rest cross dimension D410 (e.g., diameter) of the through hole 400. In embodiments where the release sheet 300 includes multiple overlap portions 322, the overlap portions 322 may differ in the amount of overlap (i.e., the width W322) from one overlap portion 322 to the next. Alternatively, the amount of overlap may be the same between all of the overlap portions 322.

According to some embodiments, and in particular certain embodiments where the release sheet 300 is provided as a plurality of sheet sections 320, the material of the release sheet 300 may exhibit a tensile elongation of 0% or higher, or at least 10%, at least 20%, at least 50%, at least 100%, at least 150%, at least 200%, or at least 500%. The tensile elongation of the release sheet 300 may be up to 100%, up to 500%, up to 800%, or up to 1000%. In certain embodiments where the release sheet 300 includes two or more sheet sections 320, particularly four or more sheet sections 320, that overlap, a release sheet with a lower tensile elongation can be selected. The material of the release sheet 300 may exhibit a tensile elongation of 0% or higher, or at least 10%, at least 20%, or at least 50%. The tensile elongation of the release sheet 300 may be up to 100%, up to 200%, up to 300%, or up to 500%. The release sheet may also exhibit a tensile strength of at least 0.1 MPa, at least 0.5 MPa, at least 1 MPa, at least 1.2 MPa, at least 1.5 MPa, at least 2 MPa, at least 3 MPa, or at least 5 MPa. The tensile strength of the release sheet may be up to 2 MPa, up to 3 MPa, up to 5 MPa, up to 10 MPa, up to 25 MPa, up to 50 MPa, up to 100 MPa, or up to 200 MPa. Suitable materials for such release sheets include polyolefins (including metallocene-catalyzed olefins), elastomers, acrylic or methacrylic mono-polymers or co-polymers, co-polyesters, synthetic and natural rubbers, polyurethanes, polyesters, polymer-coated films or Kraft papers, siliconized Kraft papers, high density polyethylenes, polypropylenes, and combinations thereof. In one exemplary embodiment, the release sheet includes high density polyethylene. For example, the release sheet 300 may be made from a layered material where at least one layer is high density polyethylene.

The number of overlapping sheet sections 320 can be any suitable number, such as 2, 3, 4, 5, etc., up to 20. In some embodiments, the number of overlapping sheet sections 320 and thus overlap portions 322 is between 2 and 16. The sheet sections 320 may further include one or more lines of separation 304.

In some embodiments, the release sheet 300 has an expandable contracted surface 351 that surrounds the through hole 400, as shown in FIGS. 6a-6d. The expandable contracted surface 351 is capable of expanding to accommodate the protrusion (e.g., pipe) when the adhesive seal is installed. In certain embodiments, the release sheet includes a first (inner) release sheet 350 surrounding the through hole 400 and disposed over an inner portion 104 of the elastic sealing sheet 100, and a second (outer) release sheet 360 disposed over an outer portion 105 of the elastic sealing sheet 100, where the outer portion 105 extends radially from the inner portion 104. The first release sheet 350 may have an expandable contracted surface 351, and the second release sheet 360 may be an "ordinary" release sheet, such as a flat release sheet without an expandable contracted surface. The first and second release sheets 350, 360 may be separate and distinct articles, and may be made from the same or different materials. The first and second release sheets 350, 360 may independently include one or more lines of separation. In certain embodiments, the second release sheet 360 includes a line or separation extending from an outer edge of the inner portion to an outside edge 103 of the elastic sealing sheet 100.

According to some embodiments, and in particular certain embodiments where the release sheet 300 includes a release sheet (e.g., a first release sheet 350) with an expandable contracted surface 351, the material of the release sheet 300 may exhibit a tensile elongation of 0% or higher, or at least 10%, at least 20%, at least 50%, at least 100%, at least 150%, at least 200%, or at least 500%. The tensile elongation of the release sheet 300 may be up to 100%, up to 500%, up to 800%, or up to 1000%. The release sheet may also exhibit a tensile strength of at least 0.1 MPa, at least 0.5 MPa, at least 1 MPa, at least 1.2 MPa, at least 1.5 MPa, at least 2 MPa, at least 3 MPa, or at least 5 MPa. The tensile strength of the release sheet may be up to 2 MPa, up to 3 MPa, up to 5 MPa, up to 10 MPa, up to 25 MPa, up to 50 MPa, up to 100 MPa, or up to 200 MPa. Suitable materials for such release sheets include polyolefins (including metallocene-catalyzed olefins), elastomers, acrylic or methacrylic mono-polymers or co-polymers, co-polyesters, synthetic and natural rubbers, polyurethanes, polyesters, polymer-coated films or Kraft papers, siliconized Kraft papers, high density polyethylenes, polypropylenes, and combinations thereof. In one exemplary embodiment, the release sheet 300 (e.g., the first release sheet 350 and/or the second release sheet 360) includes high density polyethylene. For example, the release sheet 300 may be made from a layered material where at least one layer is high density polyethylene.

Figure 6A:
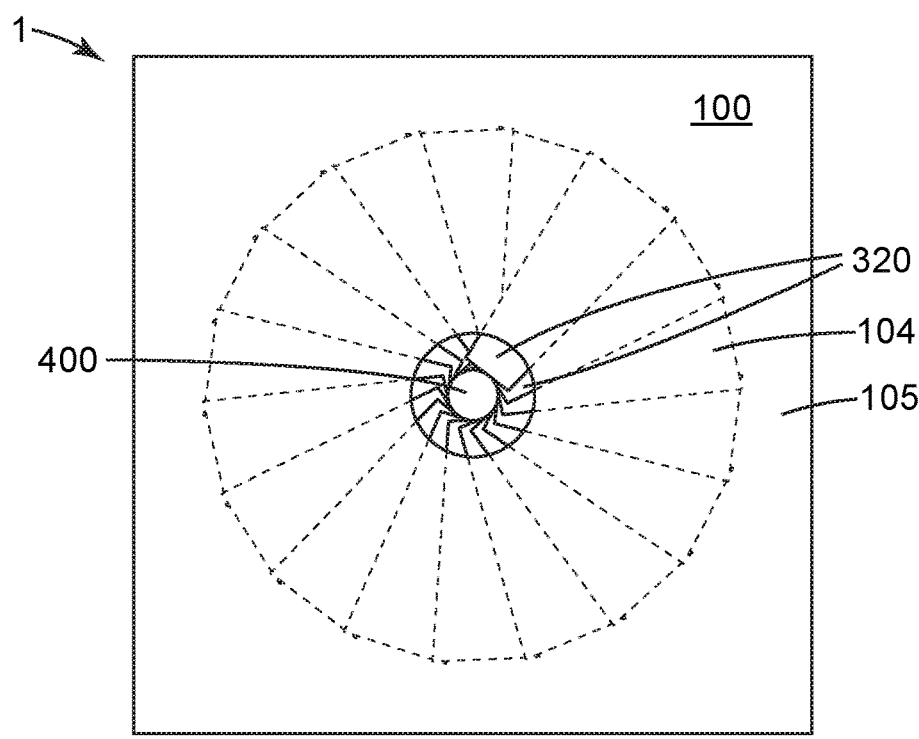
FIG. 6a is a top view of an adhesive seal according to an embodiment.
Figure 6B:
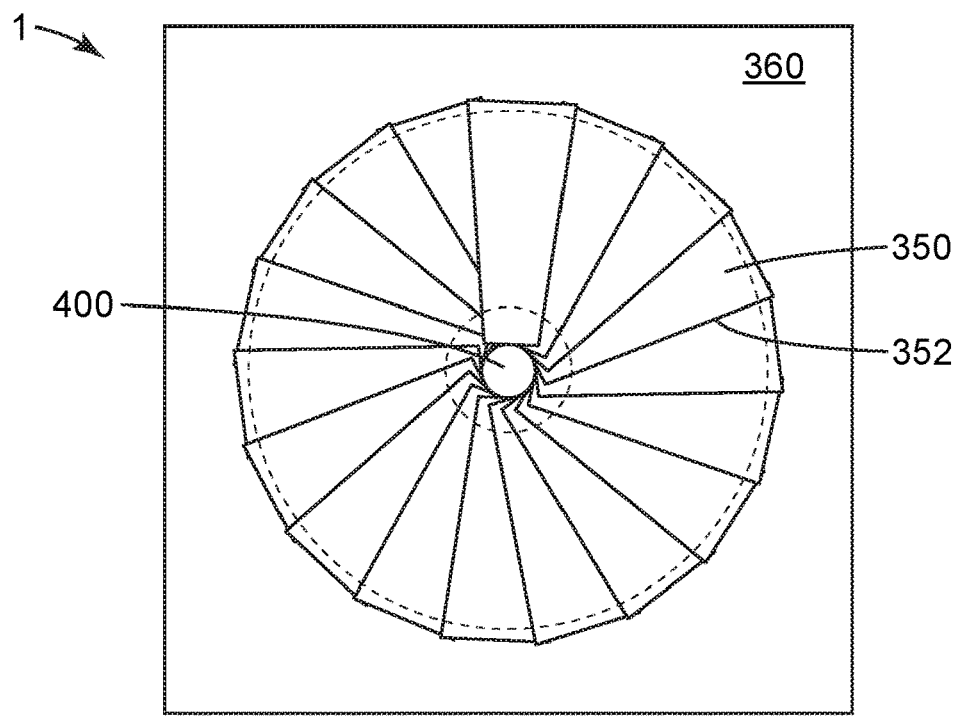
FIG. 6b is a bottom view of the adhesive seal of FIG. 6a according to an embodiment.
Figure 6C:
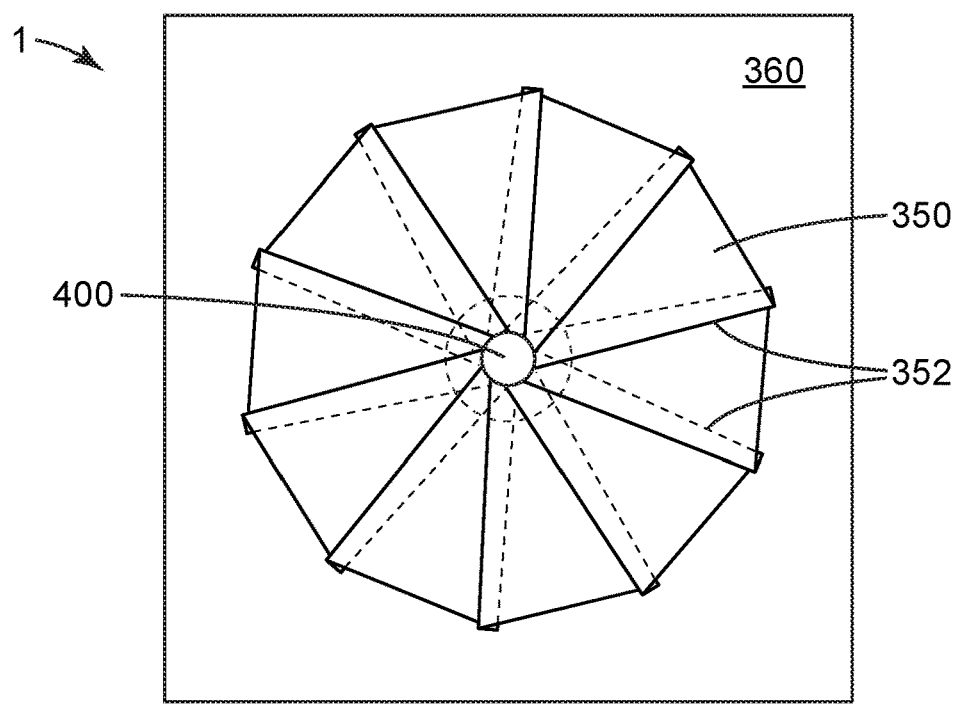
FIG. 6c is a bottom view of an adhesive seal according to an embodiment.
Figure 6D:
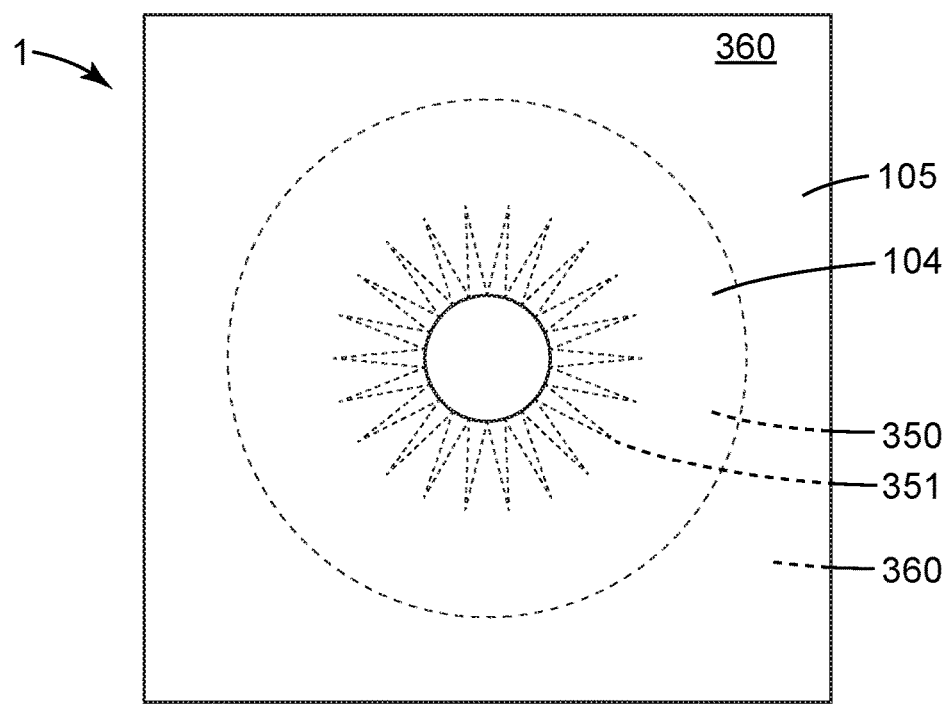
FIG. 6d is a top view of an adhesive seal according to an embodiment.

In certain embodiments, the release sheet 300 with an expandable contracted surface 351 can be a creped sheet or comprise a plurality of folds 352, as shown in FIGS. 6a-6c (folded sheet) and 6d (creped sheet). The plurality of folds 352 may be positioned adjacent to and around the perimeter 403 of the through hole 400 such that the folds 352 extend radially outwardly from the through hole 400. In some cases, the release sheet 300 may at least partially extend into or over the through hole 400 so that the release sheet 300 is at least partially visible from the frontside of the adhesive seal 1, as seen in FIG. 6a.

An exemplary embodiment of an adhesive seal roll 500 is shown in FIG. 7a. The adhesive seal roll 500 includes a plurality of adhesive seals 510 connected to each other end-to-end and rolled around a roll axis 500A. The adhesive seals 510 have a length L510 and a width W510, such that the width W510 determines the width W500 of the roll 500 extending from a first end 501 to a second end 502.

The rolled adhesive seal 510 includes an elastic sealing sheet 100, an adhesive layer 200, and a release sheet 300.

The rolled adhesive seal 510 may be provided with lines of separation 511 (e.g., perforations) such that a user can detach a sheet of adhesive seal along the line of separation 511. Alternatively, the user may cut a desired size and shape piece of material from the adhesive seal roll 500.

Figure 7B:
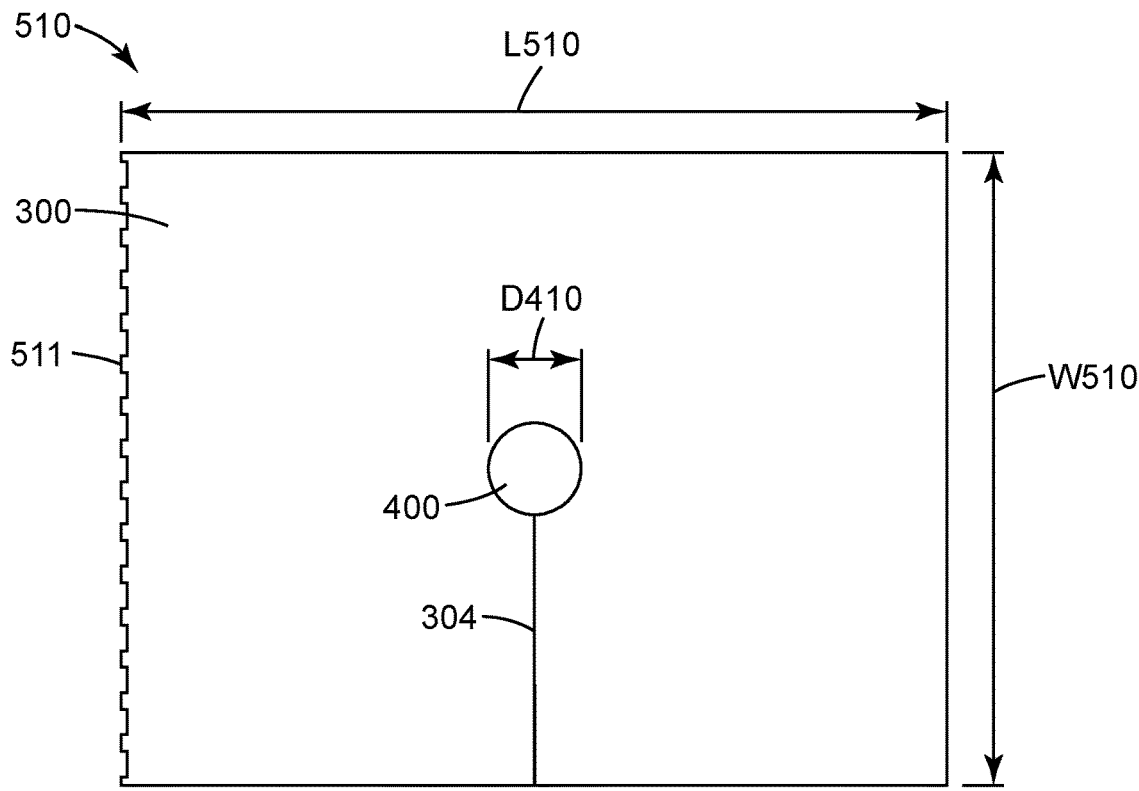
FIG. 7b is a bottom view of an adhesive seal of FIG. 7a according to an embodiment.
Figure 7C:
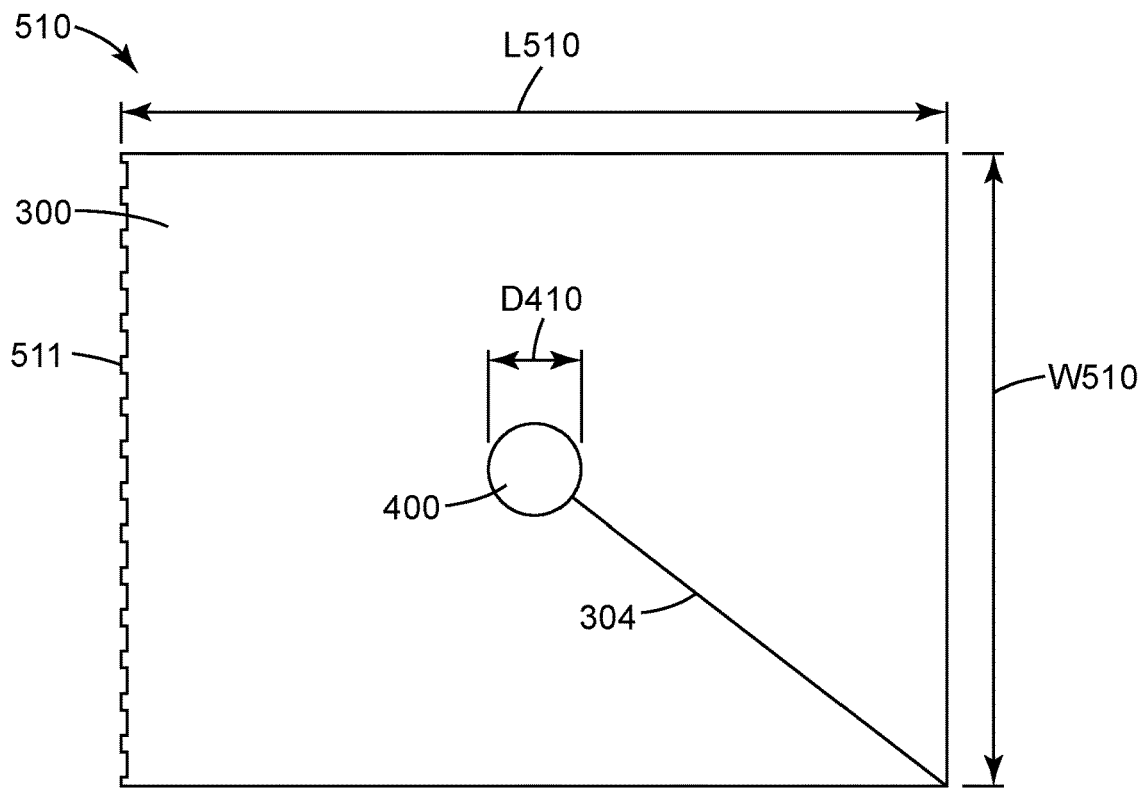
FIG. 7c is a bottom view of an adhesive seal of FIG. 7a according to an embodiment.
Figure 7D:
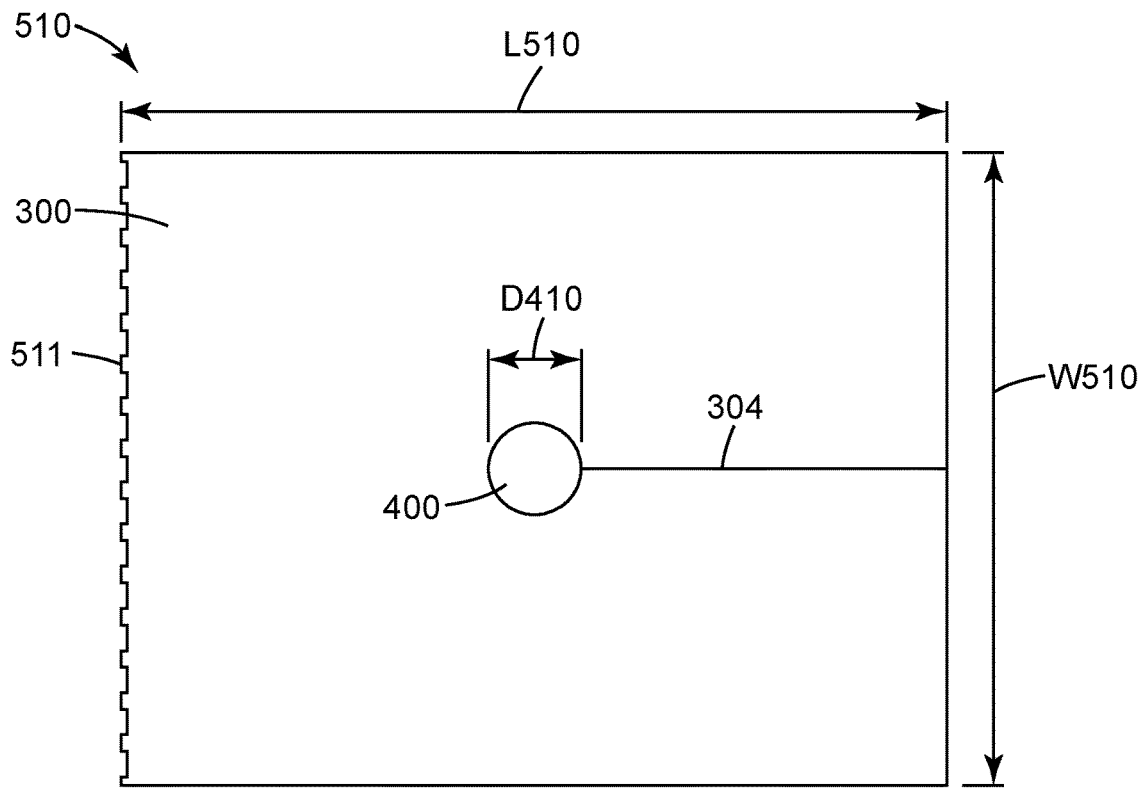
FIG. 7d is a bottom view of an adhesive seal of FIG. 7a according to an embodiment.
Figure 7E:
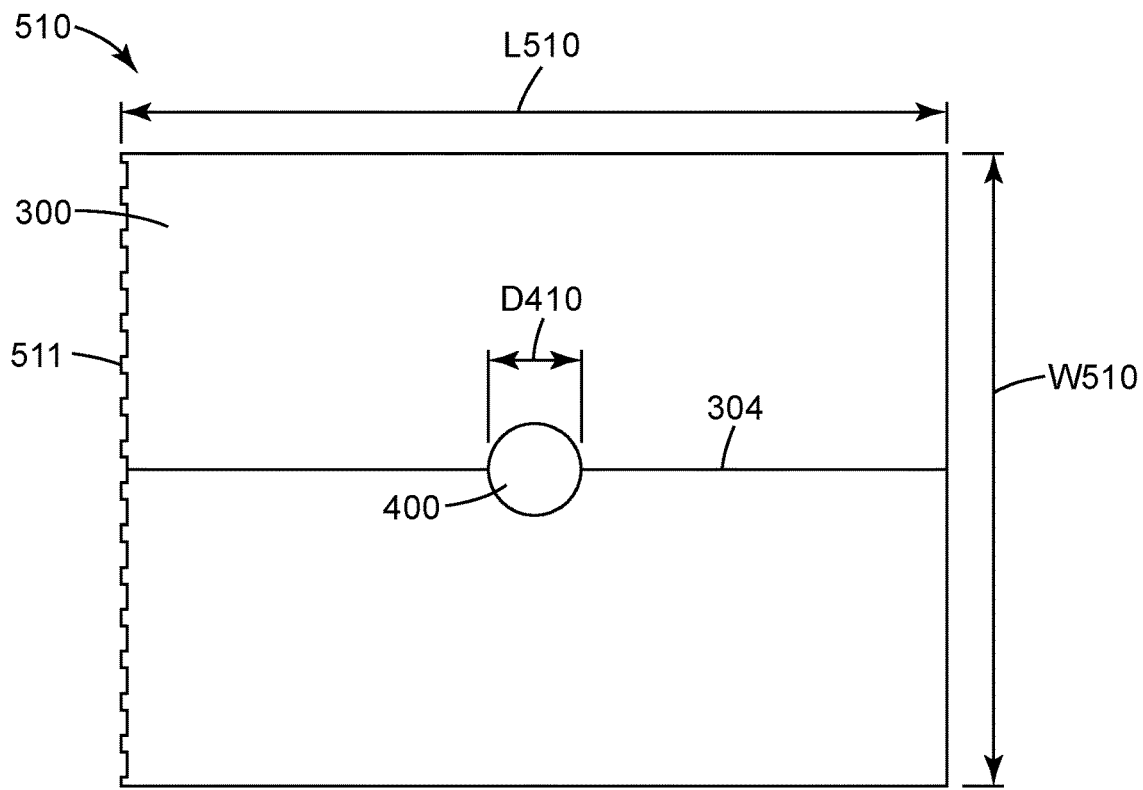
FIG. 7e is a bottom view of an adhesive seal of FIG. 7a according to an embodiment.
Figure 7F:
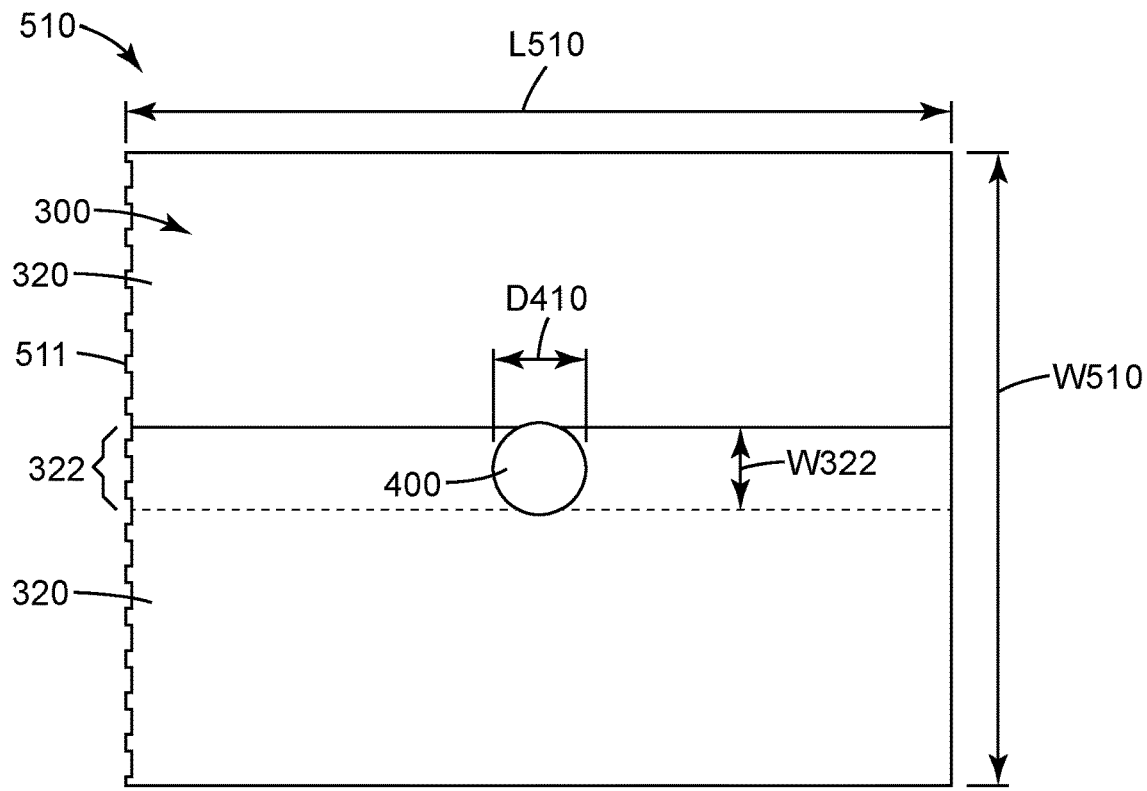
FIG. 7f is a bottom view of an adhesive seal of FIG. 7a according to an embodiment.
Figure 7G:
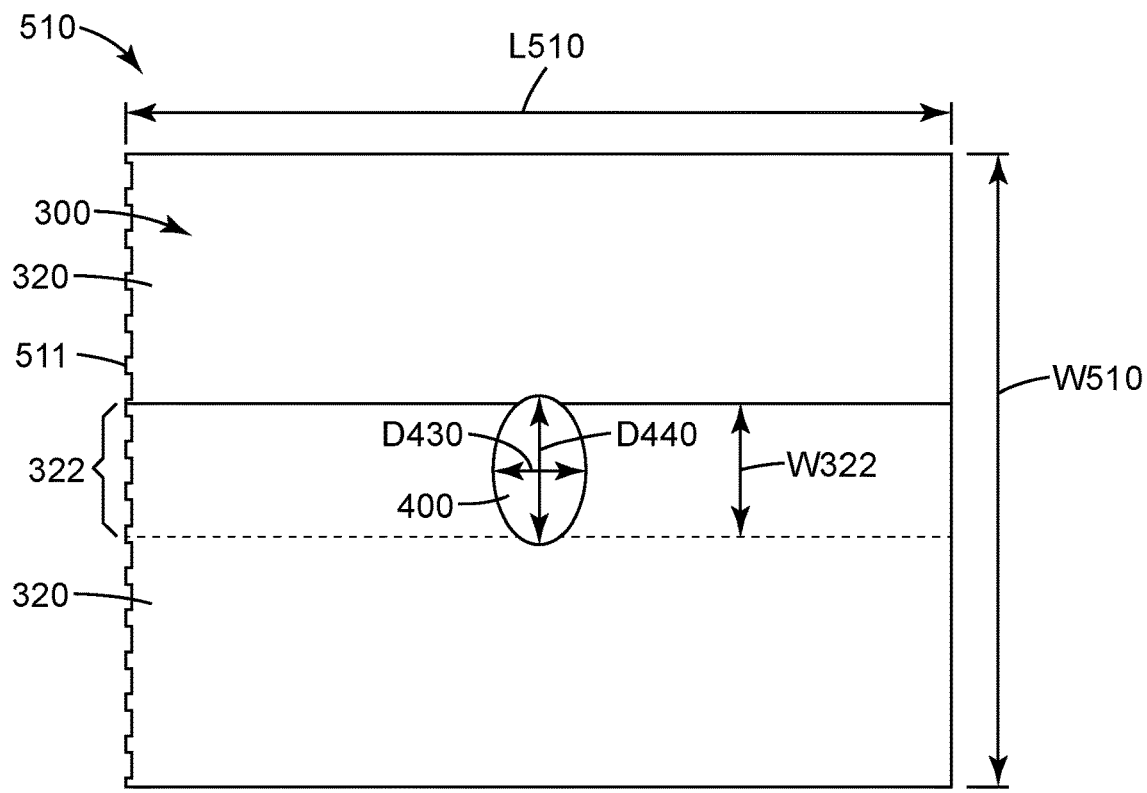
FIG. 7g is a bottom view of an adhesive seal of FIG. 7a according to an embodiment.

The release sheet 300 of the rolled adhesive seal 510 may be pre-cut to include slits or lines of separation 304 at a repeating interval, as shown in FIGS. 7b-7d, or extending across the sheet in a longitudinal direction ("machine direction"), as shown in FIG. 7e, such that an adhesive seal 510 separated from the roll includes at least one slit or line of separation 304 on the release sheet 300. The release sheet 300 may also include a plurality of sheet sections 320 and overlap portions 322, as shown in FIGS. 7f and 7g. The overlap portions 322 may be arranged parallel to the length L510 of the adhesive seal 510, or in any other orientation, such as parallel to the width W510 of the adhesive seal 510.

Method

According to at least some embodiments, the adhesive seal is configured for sealing gaps between a surface, such as a wall, and a feature such as a pipe, a conduit, a recessed light, or other protrusion penetrating the surface. According to certain embodiments, the adhesive seals can be used to reduce or prevent air or moisture from leaking through such gaps.

Figure 8:
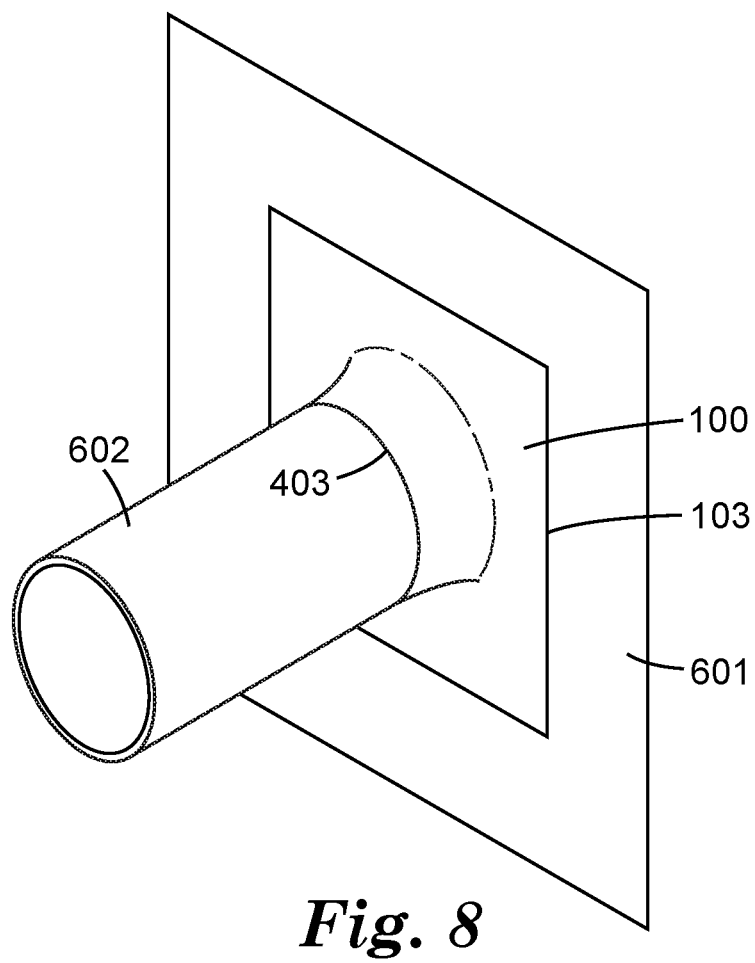
FIG. 8 is a perspective view of the adhesive seal of FIG. 1a in use in the environment according to an embodiment.

If the adhesive seal is provided without a through hole, a though hole is first cut into the adhesive seal. In order to be able to seal gaps between the protrusion and the wall, the through hole should be smaller than the protrusion (e.g., the through hole should have a perimeter that is smaller than the perimeter of the protrusion). The adhesive seal is applied by positioning the through hole over the protrusion with the backside of the adhesive seal and the release sheet facing the wall, and pushing the adhesive seal against the protrusion so that the protrusion stretches the material of the elastic sealing sheet until the through hole is stretched big enough to allow the protrusion to go through the through hole. The adhesive seal is further pushed down along the protrusion until the outer portion of the adhesive seal comes into contact with the wall. The outer portion of the adhesive seal contacts the wall, and the stretched inner portion surrounds a length of the protrusion extending outwardly from the wall. The release sheet can then be removed to allow the adhesive to adhere the elastic sealing sheet to the wall and the protrusion. FIG. 8 shows a schematic view of the adhesive seal 1 installed to cover gaps around a pipe 602 protruding from a wall 601.

According to some embodiments, after the adhesive seal is installed, the elastic sealing sheet covers the transition area between the wall and the protrusion penetrating through the wall and has no seams or cuts in the transition area. The transition area may extend at least 0.5 inch (1.3 cm), at least 1 inch (2.5 cm), at least 2 inches (5.1 cm), or from 0.5 inch to 4 inches (1.3 cm to 25.4 cm) axially outwardly along the sides of the protrusion and radially outwardly along the wall.

EXEMPLARY EMBODIMENTS

Embodiment 1 is an adhesive seal comprising: an elastic sealing sheet having a first major surface and a second major surface separated by a thickness; an adhesive layer on the first major surface; a release sheet on the adhesive layer, the release sheet defining a single sheet covering at least 90% of the surface area of the adhesive layer such that the adhesive layer is positioned between the elastic sealing sheet and the release sheet; and a through hole extending through the thickness of the elastic sealing sheet, the adhesive layer, and the release sheet.

Embodiment 2 is the adhesive seal of embodiment 1, wherein the release sheet comprises one or more lines of separation.

Embodiment 3 is the adhesive seal of embodiment 2, wherein the one or more lines of separation extend outwardly from a perimeter of the through hole.

Embodiment 4 is the adhesive seal of any one of embodiments 1-3, wherein the release sheet comprises one or more lines of separation extending from a perimeter of the through hole to an outside edge of the elastic sealing sheet.

Embodiment 5 is the adhesive seal of any one of embodiments 1-4, wherein the release sheet exhibits a tensile elongation of at least 50%, at least 100%, at least 150%; and/or up to 500%, up to 800%, or up to 1000%.

Embodiment 6 is the adhesive seal of any one of embodiments 1-5, wherein the release sheet exhibits a tensile strength of at least 0.1 MPa, at least 0.5 MPa, at least 1 MPa, at least 1.2 MPa, at least 1.5 MPa, at least 2 MPa, at least 3 MPa, or at least 5 MPa; and/or up to 2 MPa, up to 3 MPa, up to 5 MPa, up to 10 MPa, up to 25 MPa, up to 50 MPa, up to 100 MPa, or up to 200 MPa.

Embodiment 7 is the adhesive seal of any one of embodiments 1-6, wherein the release sheet comprises polyolefins (including metallocene-catalyzed olefins), elastomers, acrylic or methacrylic mono-polymers or co-polymers, co-polyesters, synthetic and natural rubbers, polyurethanes, or combinations thereof.

Embodiment 8 is the adhesive seal of any one of embodiments 1-7, wherein the release sheet comprises low density polyethylene.

Embodiment 9 is an adhesive seal comprising: an elastic sealing sheet having a first major surface and a second major surface separated by a thickness; an adhesive layer on the first major surface; a through hole extending through the thickness of the elastic sealing sheet and the adhesive layer, the through hole comprising a perimeter; and a release sheet comprising a plurality of sheet sections arranged to cover at least 90% of the surface area of the adhesive layer such that the adhesive layer is positioned between the elastic sealing sheet and the release sheet, at least two of the sheet sections comprising an edge intersecting the perimeter of the through hole.

Embodiment 10 is the adhesive seal of embodiment 9, wherein at least two sheet sections of the release sheet overlap with one another, defining one or more overlap portions of the sheet sections.

Embodiment 11 is the adhesive seal of embodiment 10, wherein the through hole has a cross dimension that is greater than a width of any of the one or more overlap portions.

Embodiment 12 is the adhesive seal of embodiment 9, wherein the sheet sections of the release sheet do not overlap.

Embodiment 13 is the adhesive seal of any one of embodiments 9-12, wherein one or more sheet sections of the release sheet sections comprises one or more lines of separation.

Embodiment 14 is the adhesive seal of any one of embodiments 9-13, wherein the release sheet exhibits a tensile elongation of at least 50%, at least 100%, at least 150%, at least 200%, or at least 500% and/or up to 500%, up to 800%, or up to 1000%.

Embodiment 15 is the adhesive seal of any one of embodiments 9-14, wherein the release sheet exhibits a tensile strength of at least 0.1 MPa, at least 0.5 MPa, at least 1 MPa, at least 1.2 MPa, at least 1.5 MPa, at least 2 MPa, at least 3 MPa, or at least 5 MPa; and/or up to 2 MPa, up to 3 MPa, up to 5 MPa, up to 10 MPa, up to 25 MPa, up to 50 MPa, up to 100 MPa, or up to 200 MPa.

Embodiment 16 is the adhesive seal of any one of embodiments 9-15, wherein the release sheet comprises polyolefins (including metallocene-catalyzed olefins), elastomers, acrylic or methacrylic mono-polymers or co-polymers, co-polyesters, synthetic and natural rubbers, polyurethanes, polyesters, polymer-coated Kraft papers, siliconized Kraft papers, high density polyethylenes, polypropylenes, or combinations thereof.

Embodiment 17 is the adhesive seal of any one of embodiments 9-16, wherein the release sheet comprises low density polyethylene and/or high density polyethylene.

Embodiment 18 is an adhesive seal comprising: an elastic sealing sheet having a first major surface and a second major surface separated by a thickness; an adhesive layer on the first major surface; a through hole extending through the thickness of the elastic sealing sheet and the adhesive layer, the through hole comprising a perimeter; and a release sheet comprising a plurality of overlapping sheet sections arranged to cover at least 90% of the surface area of the adhesive layer such that the adhesive layer is positioned between the elastic sealing sheet and the release sheet, the release sheet defining one or more overlap portions intersecting the perimeter of the through hole.

Embodiment 19 is the adhesive seal of embodiment 18, wherein the through hole has a cross dimension that is greater than a width of any of the one or more overlap portions.

Embodiment 20 is the adhesive seal of embodiments 18 or 19, wherein one or more sheets of the overlapping sheet sections comprises one or more lines of separation.

Embodiment 21 is the adhesive seal of any one of embodiments 18-20, wherein the release sheet exhibits a tensile elongation of 0% or higher, or at least 10%, at least 20%, at least 50%, at least 100%, at least 150%, at least 200%, or at least 500%; and/or up to 100%, up to 500%, up to 800%, or up to 1000%.

Embodiment 22 is the adhesive seal of any one of embodiments 18-21, wherein the release sheet exhibits a tensile strength of at least 0.1 MPa, at least 0.5 MPa, at least 1 MPa, at least 1.2 MPa, at least 1.5 MPa, at least 2 MPa, at least 3 MPa, or at least 5 MPa; and/or up to 2 MPa, up to 3 MPa, up to 5 MPa, up to 10 MPa, up to 25 MPa, up to 50 MPa, up to 100 MPa, or up to 200 MPa.

Embodiment 23 is the adhesive seal of any one of embodiments 18-22, wherein the release sheet comprises polyolefins (including metallocene-catalyzed olefins), elastomers, acrylic or methacrylic mono-polymers or co-polymers, co-polyesters, synthetic and natural rubbers, polyurethanes, polyesters, polymer-coated Kraft papers, siliconized Kraft papers, high density polyethylenes, polypropylenes, or combinations thereof.

Embodiment 24 is the adhesive seal of any one of embodiments 18-23, wherein the release sheet comprises a plurality of layers, and wherein at least one layer comprises low density polyethylene and/or high density polyethylene.

Embodiment 25 is the adhesive seal of any one of embodiments 18-24, wherein the plurality of overlapping sheet sections consists of two sheet sections.

Embodiment 26 is the adhesive seal of embodiment 25, wherein the release sheet exhibits a tensile elongation of at least 10%, at least 20%, at least 50%, at least 100%, at least 150%, at least 200%, or at least 500%; and/or up to 100%, up to 500%, up to 800%, or up to 1000%.

Embodiment 27 is the adhesive seal of embodiment 25 or 26, wherein the release sheet comprises polyolefins (including metallocene-catalyzed olefins), elastomers, acrylic or methacrylic mono-polymers or co-polymers, co-polyesters, synthetic and natural rubbers, polyurethanes, polyesters, polymer-coated Kraft papers, siliconized Kraft papers, high density polyethylenes, polypropylenes, or combinations thereof.

Embodiment 28 is the adhesive seal of any one of embodiments 18-25, wherein the plurality of overlapping sheet sections comprises three or more sheet sections.

Embodiment 29 is the adhesive seal of embodiment 28, wherein the release sheet exhibits a tensile elongation of 0% or higher, or at least 10%, at least 20%, at least 50%; and/or up to 100%, up to 200%, up to 300%, or up to 500%.

Embodiment 30 is the adhesive seal of embodiment 28 or 29, wherein the release sheet comprises polyolefins (including metallocene-catalyzed olefins), elastomers, acrylic or methacrylic mono-polymers or co-polymers, co-polyesters, synthetic and natural rubbers, polyurethanes, polyesters, polymer-coated Kraft papers, siliconized Kraft papers, high density polyethylenes, polypropylenes, or combinations thereof.

Embodiment 31 is an adhesive seal comprising: an elastic sealing sheet having a first major surface and a second major surface separated by a thickness; an adhesive layer on the first major surface; a through hole extending through the thickness of the elastic sealing sheet and the adhesive layer, the elastic sealing sheet having an inner portion surrounding the through hole and an outer portion extending radially from the inner portion; and a first release sheet defining an expandable contracted surface covering the adhesive layer of the inner portion.

Embodiment 32 is the adhesive seal of embodiment 31, further comprising a second release sheet covering the adhesive layer of the outer portion.

Embodiment 33 is the adhesive seal of embodiment 32, wherein the first and second release sheets are separate and distinct articles.

Embodiment 34 is the adhesive seal of embodiment 32 or 33, wherein the second release sheet comprises one or more lines of separation.

Embodiment 35 is the adhesive seal of any one of embodiments 32-34, wherein the second release sheet comprises a line of separation extending from an outer edge of the inner portion to an outside edge of the elastic sealing sheet.

Embodiment 36 is the adhesive seal of any one of embodiments 31-35, wherein the first release sheet exhibits a tensile elongation of 0% or higher, or at least 10%, at least 20%, at least 50%, at least 100%, at least 150%, at least 200%, or at least 500%; up to 100%, up to 500%, up to 800%, or up to 1000%.

Embodiment 37 is the adhesive seal of any one of embodiments 31-36, wherein the first release sheet exhibits a tensile strength of at least 0.1 MPa, at least 0.5 MPa, at least 1 MPa, at least 1.2 MPa, at least 1.5 MPa, at least 2 MPa, at least 3 MPa, or at least 5 MPa; and/or up to 2 MPa, up to 3 MPa, up to 5 MPa, up to 10 MPa, up to 25 MPa, up to 50 MPa, up to 100 MPa, or up to 200 MPa.

Embodiment 38 is the adhesive seal of any one of embodiments 31-37, wherein the first release sheet comprises polyolefins (including metallocene-catalyzed olefins), elastomers, acrylic or methacrylic mono-polymers or co-polymers, co-polyesters, synthetic and natural rubbers, polyurethanes, polyesters, polymer-coated Kraft papers, siliconized Kraft papers, high density polyethylenes, polypropylenes, and combinations thereof.

Embodiment 39 is the adhesive seal of any one of embodiments 31-38, wherein the release sheet comprises a plurality of layers, and wherein at least one layer comprises high density polyethylene.

Embodiment 40 is the adhesive seal of any one of embodiments 31-39, wherein the first release sheet comprises a plurality of folds.

Embodiment 41 is the adhesive seal of embodiment 40, wherein the plurality of folds is positioned adjacent to and around the perimeter of the through hole.

Embodiment 42 is an adhesive seal comprising an elastic sealing sheet having a first major surface and a second major surface separated by a thickness; an adhesive layer on the first major surface; and a release sheet on the adhesive layer, the release sheet defining a single sheet covering at least 90% of the surface area of the adhesive layer such that the adhesive layer is positioned between the elastic sealing sheet and the release sheet, the single sheet comprising a line of separation extending from a central portion of the single sheet to a perimeter of the single sheet, the release sheet exhibiting a tensile elongation from 50% to 1000%.

Embodiment 43 is the adhesive seal of embodiment 42, the adhesive seal is part of a plurality of adhesive seals arranged on a roll.

Embodiment 44 is the adhesive seal of embodiment 43, wherein the roll comprises a first end and a second end and a roll axis extending from the first end to the second end, and wherein the plurality of adhesive seals comprises one or more lines of separation extending from the first end to the second end.

Embodiment 45 is an adhesive seal comprising an elastic sealing sheet having a first major surface and a second major surface separated by a thickness; an adhesive layer on the first major surface; and a release sheet comprising a plurality of overlapping sheet sections arranged to cover at least 90% of the surface area of the adhesive layer such that the adhesive layer is positioned between the elastic sealing sheet and the release sheet, the release sheet defining one or more overlap portions.

Embodiment 46 is the adhesive seal of embodiment 45, the adhesive seal is part of a plurality of adhesive seals arranged on a roll.

Embodiment 47 is the adhesive seal of embodiment 46, wherein the roll comprises a first end and a second end and a roll axis extending from the first end to the second end, and wherein the plurality of adhesive seals comprises one or more lines of separation extending from the first end to the second end.

Embodiment 48 is the adhesive seal of any one of embodiments 45-47, wherein the adhesive seal comprises a through hole, and wherein the through hole has a cross dimension that is greater than a width of any of the one or more overlap portions.

Embodiment 49 is the adhesive seal of any one of embodiments 42-48, wherein the release sheet exhibits a tensile elongation of 0% or higher, or at least 10%, at least 20%, at least 50%, at least 100%, at least 150%, at least 200%, or at least 500%; and/or up to 100%, up to 500%, up to 800%, or up to 1000%.

Embodiment 50 is the adhesive seal of any one of embodiments 42-49, wherein the release sheet exhibits a tensile strength of at least 0.1 MPa, at least 0.5 MPa, at least 1 MPa, at least 1.2 MPa, at least 1.5 MPa, at least 2 MPa, at least 3 MPa, or at least 5 MPa; and/or up to 2 MPa, up to 3 MPa, up to 5 MPa, up to 10 MPa, up to 25 MPa, up to 50 MPa, up to 100 MPa, or up to 200 MPa.

Embodiment 51 is the adhesive seal of any one of embodiments 42-50, wherein the release sheet comprises polyolefins (including metallocene-catalyzed olefins), elastomers, acrylic or methacrylic mono-polymers or co-polymers, co-polyesters, synthetic and natural rubbers, polyurethanes, polyesters, polymer-coated Kraft papers, siliconized Kraft papers, high density polyethylenes, polypropylenes, or combinations thereof.

Embodiment 52 is the adhesive seal of any one of embodiments 42-51, wherein the release sheet comprises a plurality of layers, and wherein at least one layer comprises high density polyethylene.

Embodiment 53 is the adhesive seal of any one of embodiments 1-52, wherein the adhesive seal exhibits an insertion force of greater than 0 N and less than 133 N, less than 267 N, or less than 445 N.

Embodiment 54 is the adhesive seal of any one of embodiments 1-53, wherein the elastic sealing sheet exhibits a tensile elongation of at least 50%, at least 100%, at least 500%, or at least 800%.

Embodiment 55 is the adhesive seal of any one of embodiments 1-54, wherein the elastic sealing sheet exhibits a tensile elongation of up to 100%, up to 500%, up to 800%, or up to 1000%.

Embodiment 56 is the adhesive seal of any one of embodiments 1-55, wherein the elastic sealing sheet exhibits a tensile strength of at least 0.1 MPa, at least 0.2 MPa, at least 1 MPa, at least 5 MPa, at least 10 MPa, or at least 15 MPa.

Embodiment 57 is the adhesive seal of any one of embodiments 1-56, wherein the elastic sealing sheet exhibits a tensile strength of up to 5 MPa, up to 10 MPa, up to 15 MPa, up to 20 MPa, up to 25 MPa, up to 50 MPa, up to 100 MPa, or up to 200 MPa.

Embodiment 58 is the adhesive seal of any one of embodiments 1-57, wherein the elastic sealing sheet comprises acrylic or methacrylic mono-polymers or co-polymers, acrylic foams, polyurethanes, natural rubbers, synthetic rubbers (e.g., butyl rubber and ethylene propylene diene monomer "EPDM"), linear and radial styrene block copolymers (such as styrenebutadiene, styrene-ethylene/butylene and styrene-isoprene), polyvinyl ethers, asphaltics, silicones, linear or branched polyolefins (such as olefin block copolymers, low density polyethylenes "LDPE", polypropylenes, etc.), polyamides, polystyrenes, polystyrene-butadienes, nylons, polyesters, polyester copolymers, polysulfones, polyvinylidene chlorides, styrene-maleic anhydride copolymers, styrene acrylonitrile copolymers, ionomers based on sodium or zinc salts of ethylene methacrylic acid, polymethylmethacrylates, cellulosics, fluoroplastics, polycarbonates, polyacrylonitriles, ethylene-vinyl acetate copolymers, silyl-terminated polymers (such as silyl terminated polyethers), coated woven or non-woven fabrics, or combinations thereof.

Embodiment 59 is the adhesive seal of any one of embodiments 1-58, wherein the elastic sealing sheet comprises a plurality of layers, coatings, or combinations thereof, and the first major surface is formed by one or more of the layers or coatings.

Embodiment 60 is the adhesive seal of any one of embodiments 1-59, wherein the elastic sealing sheet has a thickness of at least 0.050 mm, at least 0.10 mm, at least 0.25 mm, at least 0.50 mm, or at least 1.0 mm.

Embodiment 61 is the adhesive seal of any one of embodiments 1-60, wherein the elastic sealing sheet has a thickness of up to 0.50 mm, up to 1.25 mm, up to 1.50 mm, up to 2.0 mm, or up to 2.5 mm.

Embodiment 62 is the adhesive seal of any one of embodiments 1-41, wherein the through hole has a rest cross dimension along an axis and a stretched cross dimension along the axis, and wherein the stretched cross dimension is up to 1000% greater, up to 500% greater, up to 400% greater, up to 300% greater, up to 200% greater, or up to 100% greater, than the rest cross dimension.

Embodiment 63 is the adhesive seal of any one of embodiments 1-41 or 62, wherein the through hole is centered on the elastic sealing sheet.

Embodiment 64 is the adhesive seal of any one of embodiments 1-63, wherein the elastic sealing sheet is quadrilateral, square, rectangular, round, oval, ovoid, triangular, polygonal, rounded polygonal, or irregular in shape.

Embodiment 65 is the adhesive seal of any one of embodiments 1-64, wherein the adhesive seal comprises a through hole, and wherein the through hole is quadrilateral, square, rectangular, round, oval, ovoid, triangular, polygonal, rounded polygonal, or irregular in shape.

Embodiment 66 is the adhesive seal of any one of embodiments 1-65, wherein the elastic sealing sheet has a minor cross dimension of at least 25 mm, at least 100 mm, at least 150 mm, or at least 200 mm; and/or up to 200 mm, 250 mm, 400 mm, 500 mm, or 750 mm.

Embodiment 67 is the adhesive seal embodiment 66, wherein the elastic sealing sheet has a major cross dimension that is greater than the minor cross dimension.

Embodiment 68 is the adhesive seal of any one of embodiments 1-67, wherein the adhesive seal comprises a through hole, and wherein the through hole has a rest cross dimension that is at least 1%, at least 5%, or at least 10%; and/or up to 5%, up to 10%, up to 20%, up to 40%, up to 60%, up to 80%, or up to 90% of the minor cross dimension of the elastic sealing sheet.

Embodiment 69 is the adhesive seal of any one of embodiments 1-68, wherein the adhesive seal comprises a through hole, and wherein the through hole has a rest cross dimension of at least 3 mm, at least 5 mm, at least 10 mm, at least 20 mm, or at least 50 mm; and/or up to 300 mm, up to 250 mm, up to 200 mm, up to 150 mm, up to 100 mm, up to 75 mm, up to 50 mm, up to 40 mm, up to 30 mm, or up to 20 mm.

Embodiment 70 is the adhesive seal of any one of embodiments 1-69, wherein the release sheet has a minor cross dimension that is the same as the minor cross dimension of the elastic sealing sheet.

Embodiment 71 is the adhesive seal of any one of embodiments 1-70, wherein the release sheet has a major cross dimension that is the same as the major cross dimension of the elastic sealing sheet.

Embodiment 72 is the adhesive seal of any one of embodiments 1-71, wherein the release sheet covers at least 95%, at least 98%, or at least 99%, of the surface area the adhesive layer.

Embodiment 73 is the adhesive seal of any one of embodiments 1-72, wherein the release sheet covers the surface area of the adhesive layer completely.

Embodiment 74 is the adhesive seal of any one of embodiments 1-73, wherein the adhesive layer comprises a homopolymer or copolymer of butyl rubber, styrene-butadiene-styrene (SBS), styrene-isoprene-styrene (SIS), styrene butadiene (SB), styrene-ethylene-butadiene-styrene (SEBS), ethylene/vinylacetate (EVA), (meth)acrylic (such as isooctyl acrylate and 2-ethylhexyl acrylate), acrylic acid, itaconic acid, 2-carboxy ethyl acrylate, acrylamide, their substituted derivatives, or combinations thereof.

EXAMPLES

Adhesive seals were tested for insertion force and displacement and for tensile properties, including tensile modulus, tensile strength, and tensile elongation. Samples were prepared using a conformable sealing tape and various release liners 1-8 as described in TABLE 1 below.

TABLE 1

| Materials | |
|---|---|
| Designation | Description |
| Conformable sealing tape | Three-layered construction of, in order, a top film having a thickness of 16 μm, a middle core having a thickness of 890 μm, and an acrylic adhesive layer having a thickness of 200 μm. Available as Flexible Air Sealing Tape ("FAST"), product number UC8045 available from 3M Company in St Paul, MN |
| Release Liner 1 | Polymer-coated Kraft paper having a thickness of 102 μm (0.004 inch); 58 pound paper having a silicone acrylate release coating on both sides, prepared according to the process described in Example 61 of US 2013/0059105. |
| Release Liner 2 | Polyester film having a silicone treatment on both sides and a thickness of 51 μm (0.002 inch), available as 2.0 CL PET U4162/U4162 from Loparex in Hammond, WI. |
| Release Liner 3 | Red pigmented, multilayer, thermoplastic olefin film containing a proprietary blend of high density polyethylene and low density polyethylene, having a thickness of about 63 μm (0.0025 inch), available from Iso Poly Films, Inc. in Gray Court, SC. |
| Release Liner 4 | Cast polypropylene film having one glossy side and one matte side and a thickness of 89 μm (0.0035 inch). |
| Release Liner 5 | Clear low density polyethylene film having a silicone treatment on one side, and a thickness of 51 μm (0.002 inch), available from Loparex in Hammond, WI. |

TABLE 1-continued

Materials

| Designation | Description |
|---|---|
| Release Liner 6 | Film believed to be a crosslinked ethylene/vinyl acetate polymer, treated on one side a silicone release composition to provide a release liner, having a thickness of 1016 μm (0.04 inch). |
| Release Liner 7 | Clear linear low density polyethylene film having a thickness of 51 μm (0.002 inch), available as 44402 2.0 NT LLD from Loparex in Hammond, WI. |
| Release Liner 8 | White low density polyethylene film having a silicone treatment on one side and a thickness of 102 μm (0.004 inch) available from Loparex in Hammond, WI. |

Example 1

The insertion force required to apply the conformable sealing tape onto protrusions was evaluated.

Insertion force was tested on the conformable sealing tape without a release liner and with various release liners by measuring the force required to insert probes of various diameters through holes of various diameters on the conformable sealing tape. The displacement distance was also measured.

Sample Preparation

Samples were prepared by cutting the conformable sealing tape to a size of about 6 inches by 6 inches (15.2 centimeters by 15.2 centimeters) and by punching a hole with a metal punch in the center of the sample.

Samples 1A-1L consisted of the conformable sealing tape without a release liner. The hole sizes varied according to TABLE 2 below. The hole extended through the thickness of the conformable sealing tape.

Samples 2A-2D were prepared by adhering Release Liner 5 to the conformable sealing tape using a rubber roller and hand pressure such that the siliconized side of the release liner contacted the acrylic adhesive layer of the conformable sealing tape. The resulting laminate articles were cut with a circular metal punch with a 2.22 cm diameter from the release liner side. Each test specimen had one hole that was centered on the top film surface and went all the way through the thickness of the conformable sealing tape and release liner.

Samples 3A-3D were prepared as samples 2A-2D except that the release liner was slit such that there was a line of separation extending from the through hole to the edge of the sample in the cross-web direction.

Samples 4A-4D were prepared as samples 2A-2D except that two separate sheets of release liner were laminated such that they were parallel and overlapping in the down-web direction with an overlap portion having a width of 2.06 cm. The circular metal punch with a diameter of 2.22 cm was centered on the overlap width such that it cut through edges of both sheets of release liner.

Samples 5A-5D were prepared as samples 2A-2D except that the probe was pushed through the test specimens from the top film side opposite the release liner side.

Samples 6A-6D were prepared as samples 4A-4D except that the overlap width measured 3.33 cm and the metal punch was oval shaped with a minor-axis measuring 2.22 cm aligned in the down-web direction and a major-axis measuring 3.49 cm aligned in the cross-web direction.

Sample 7 was prepared as sample 3A except that the through hole measured 1.91 cm in diameter and release liner 7 was used.

Sample 8 was prepared as sample 7 except that release liner 1 was used.

Sample 9 was prepared as sample 7 except that release liner 2 was used.

Sample 10 was prepared as sample 7 except that release liner 3 was used.

Sample 11 was prepared as sample 7 except that release liner 8 was used.

Sample 12 was prepared as sample 7 except that release liner 4 was used.

Solid metal probes of various diameters and a length of approximately 6 inches (15 cm) were used to insert through the holes of various sizes.

Insertion force was measured using a tensile testing machine with a 225 lb load cell at a rate of 20 inches/minute (51 cm/min). Samples were placed and centered in a jig measuring approximately 5 inches by 5 inches (13 cm by 13 cm) and secured so that there was no sag in the sample. The jig with the sample was then placed on two support members that rested on the bottom platform of the testing machine such that the film article was suspended between 6 and 13.9 inches (15.2 and 35.2 cm) above the platform. A probe was attached to the upper jaw of the machine and positioned just above the hole in the conformable sealing tape. The probe was then moved through the hole in the sample and the force and displacement distance ("Displ. Distance") were recorded by the system controller. The probe was pushed through from the side of the release liner with the exception of samples 1A-1L (conformable sealing tape without a release liner) and 5A-5D, where the probe was pushed through the top side of the tape. Results of the testing are shown in TABLE 2 below.

TABLE 2

Insertion Force and Displacement Distance

| Sample | Probe Diameter (cm) | Hole Diameter (cm) | Diff. D (Probe) − D (Hole) (cm) | Ratio D (Probe)/D (Hole) (%) | Peak Force (N) | Displ. Distance (cm) |
|---|---|---|---|---|---|---|
| 1A | 2.54 | 1.11 | 1.43 | 229% | 21.47 | 4.04 |
| 1B | 5.08 | 2.54 | 2.54 | 200% | 33.25 | 4.66 |

TABLE 2-continued

Insertion Force and Displacement Distance

| Sample | Probe Diameter (cm) | Hole Diameter (cm) | Diff. D (Probe) − D (Hole) (cm) | Ratio D (Probe)/D (Hole) (%) | Peak Force (N) | Displ. Distance (cm) |
|---|---|---|---|---|---|---|
| 1C | 5.08 | 2.54 | 2.54 | 200% | 39.96 | 7.02 |
| 1D | 5.08 | 2.38 | 2.70 | 213% | 47.90 | 7.50 |
| 1E | 5.08 | 2.22 | 2.86 | 229% | 80.56 | 10.84 |
| 1F | 5.08 | 1.91 | 3.18 | 267% | 85.79 | 12.92 |
| 1G | 5.08 | 1.11 | 3.97 | 457% | 129.95 | 15.25 |
| 1H | 5.08 | 1.11 | 3.97 | 457% | 128.27 | 18.62 |
| 1I | 7.62 | 2.54 | 5.08 | 300% | 179.15 | 17.56 |
| 1J | 7.62 | 1.11 | 6.51 | 685% | 299.62 | 35.11 |
| 1K | 10.16 | 5.08 | 5.08 | 200% | 74.65 | 3.91 |
| 1L | 10.16 | 2.54 | 7.62 | 400% | 244.95 | 18.74 |
| 2A | 2.54 | 2.22 | 0.32 | 114% | 8.55 | 1.12 |
| 2B | 5.08 | 2.22 | 2.86 | 229% | 92.13 | 5.39 |
| 2C | 7.62 | 2.22 | 5.40 | 343% | 250.42 | 6.46 |
| 2D | 10.16 | 2.22 | 7.94 | 457% | 397.64 | 8.70 |
| 3A | 2.54 | 2.22 | 0.32 | 114% | 6.01 | 1.02 |
| 3B | 5.08 | 2.22 | 2.86 | 229% | 79.51 | 3.04 |
| 3C | 7.62 | 2.22 | 5.40 | 343% | 192.89 | 5.72 |
| 3D | 10.16 | 2.22 | 7.94 | 457% | 324.82 | 4.65 |
| 4A | 2.54 | 2.22 | 0.32 | 114% | 7.20 | 1.00 |
| 4B | 5.08 | 2.22 | 2.86 | 229% | 93.43 | 3.34 |
| 4C | 7.62 | 2.22 | 5.40 | 343% | 184.09 | 5.31 |
| 4D | 10.16 | 2.22 | 7.94 | 457% | 355.88 | 6.07 |
| 5A | 2.54 | 2.22 | 0.32 | 114% | 10.72 | 1.30 |
| 5B | 5.08 | 2.22 | 2.86 | 229% | 238.34 | 9.00 |
| 5C | 7.62 | 2.22 | 5.40 | 343% | 440.33* | 16.79* |
| 5D | 10.16 | 2.22 | 7.94 | 457% | 714.55** | 10.02** |
| 6A | 2.54 | 2.22 | 0.32 | 114% | 2.00 | 0.64 |
| 6B | 5.08 | 2.22 | 2.86 | 229% | 62.13 | 2.64 |
| 6C | 7.62 | 2.22 | 5.40 | 343% | 174.41 | 4.69 |
| 6D | 10.16 | 2.22 | 7.94 | 457% | 315.25 | 4.96 |
| 7 | 5.08 | 1.91 | 3.18 | 267% | 94.37 | 3.65 |
| 8 | 5.08 | 1.91 | 3.18 | 267% | 233.96*** | 2.08*** |
| 9 | 5.08 | 1.91 | 3.18 | 267% | 228.78 | 2.83 |
| 10 | 5.08 | 1.91 | 3.18 | 267% | 185.36 | 2.71 |
| 11 | 5.08 | 1.91 | 3.18 | 267% | 147.39 | 3.07 |
| 12 | 5.08 | 1.91 | 3.18 | 267% | 189.34 | 3.27 |

*The test was stopped before the probe pushed through the through hole because the sample pulled through the square jig.
**The test was stopped before the probe pushed through the through hole because the sample broke around at the point of contact with the probe.
***Release liner 1 tore prior to the probe completely penetrating the through hole, recording a premature Peak Force and Displacement Diameter. The probe penetrated the through hole at 3.8 cm of Displacement Distance.

It was generally observed that the liner's tensile properties and layout affected the insertion force, and that the relationship between the pipe diameter and the hole diameter affected the insertion force needed to push the probe through the adhesive seal.

Example 2

Tensile properties of release liners 1-7 of TABLE 1 were tested. The samples were tested using ASTM D882-12 Standard Test Method for Tensile Properties of Thin Plastic Sheeting with some modifications discussed in the Test Method section below.

Sample Preparation:

three straight section specimens measuring 12.5 mm (0.5 inch) wide and 152 mm (6 inches) long, and having a thickness generally between approximately 0.15 and 0.76 mm (0.006 to 0.030 inch) were cut from each release liner in the downweb (also referred to as the machine direction) and crossweb directions. The samples were conditioned for a minimum of 24 hours at 23+/−2° C. and 50+/−5% relative humidity prior to testing.

Test Method:

the separation distance between parallel grips was 100 mm (4 inches) and the crosshead speed was 51 mm/min (2 inches/minute). The separation rate, force measurements, and data calculations were carried out by the system controller. Samples were tested in both the machine direction and the crossweb direction. The average of two test samples was reported. Results are shown in TABLE 3 below.

TABLE 3

Tensile Testing

| | Machine Direction | | | Cross Direction | | |
|---|---|---|---|---|---|---|
| Release Liner | Modulus (MPa) | Strength at Break (MPa) | Elongation at Break (%) | Modulus (MPa) | Strength at Break (MPa) | Elongation at Break (%) |
| 1 | 3157 | 28.53 | 2.70 | 7457 | 78.29 | 1.68 |
| 2 | 5088 | 195.30 | 43.21 | 4448 | 136.04 | 52.33 |
| 3 | 1367 | 30.85 | 7.19 | 1233 | 25.12 | 18.53 |
| 4 | 1325 | 22.39 | 9.21 | 1300 | 23.51 | 10.93 |
| 5 | 216 | 15.41 | 259.23 | 1769 | 6.38 | 43.53 |
| 6 | 6 | 1.26 | 212.83 | 3 | 0.97 | 346.06 |
| 7 | 2053 | 16.58 | 450.01 | 117 | 20.29 | 173.03 |

Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and

What is claimed is:

1. An adhesive seal comprising:
an elastic sealing sheet having a first major surface and a second major surface separated by a thickness;
an adhesive layer on the first major surface;
a release sheet on the adhesive layer, the release sheet defining a single sheet covering at least 90% of a surface area of the adhesive layer such that the adhesive layer is positioned between the elastic sealing sheet and the release sheet, and wherein the release sheet exhibits a tensile elongation from 50% to 1000%; and
a through hole extending through the thickness of the elastic sealing sheet, the adhesive layer, and the release sheet,
wherein the release sheet comprises only one line of separation, wherein the only one line of separation extends outwardly from a perimeter of the through hole, or wherein the release sheet comprises two or more lines of separation, each extending outwardly from a perimeter of the through hole to an outer edge of the release sheet.

2. The adhesive seal of claim 1, wherein the release sheet comprises polyolefins, elastomers, acrylic or methacrylic mono-polymers or co-polymers, co-polyesters, synthetic and natural rubbers, polyurethanes, or combinations thereof.

3. The adhesive seal of claim 1, wherein the release sheet comprises low density polyethylene.

4. The adhesive seal of claim 1, wherein the through hole has a rest cross dimension along an axis and a stretched cross dimension along the axis, and wherein the stretched cross dimension is up to 1000% greater than the rest cross dimension.

5. The adhesive seal of claim 1, wherein the release sheet exhibits a tensile strength from 0.1 MPa to 200 MPa.

6. The adhesive seal of claim 1, wherein the release sheet comprises a polyolefin, an elastomer, an acrylic or methacrylic mono-polymer or co-polymer, a co-polyester, a synthetic or natural rubber, a polyurethane, a polyester, a polymer-coated Kraft paper, a siliconized Kraft paper, high density polyethylene, polypropylene, or a combination thereof.

7. The adhesive seal of claim 1, wherein the release sheet comprises a plurality of layers, and wherein at least one layer comprises high density polyethylene.

8. The adhesive seal of claim 1, wherein the release sheet comprises the only one line of separation.

9. The adhesive seal of claim 1, wherein the release sheet comprises the two or more lines of separation, wherein the two or more lines of separation consist of lines of separation extending outwardly from a perimeter of the through hole to an outer edge of the release sheet.

10. The adhesive seal of claim 1, wherein the adhesive seal is part of a plurality of adhesive seals arranged on a roll.

11. The adhesive seal of claim 1, wherein the roll comprises a first end and a second end and a roll axis extending from the first end to the second end, and wherein the plurality of adhesive seals comprises one or more lines of separation extending from the first end to the second end.

12. The adhesive seal of claim 1, wherein the through hole extending through the elastic sealing sheet has a different size than the through hole extending through the release sheet.

13. The adhesive seal of claim 1, wherein the elastic sealing sheet comprises an acrylic or methacrylic mono-polymer or co-polymer, an acrylic foam, a polyurethane, natural rubber, butyl rubber, ethylene propylene diene monomer rubber, a linear or radial styrene block copolymer, a polyvinyl ether, an asphaltic, a silicone, a linear or branched polyolefin, a polyamide, a polystyrene, a polyester copolymer, a polysulfone, a polyvinylidene chloride, a styrene-maleic anhydride copolymer, a styrene acrylonitrile copolymer, an ionomer based on a sodium or zinc salt of ethylene methacrylic acid, a cellulosic, a fluoroplastic, a polycarbonate, a polyacrylonitrile, an ethylene-vinyl acetate copolymer, a silyl-terminated polymer, a coated woven or non-woven fabric, or a combination thereof.

14. The adhesive seal of claim 1, wherein the elastic sealing sheet is quadrilateral, square, rectangular, round, oval, ovoid, triangular, polygonal, rounded polygonal, or irregular in shape.

15. The adhesive seal of claim 1, wherein the elastic sealing sheet is quadrilateral, square, rectangular, triangular, polygonal, or rounded polygonal.

16. The adhesive seal of claim 1, wherein the elastic sealing sheet has a minor cross dimension of at least 25 millimeters and up to 750 millimeters.

17. The adhesive seal of claim 1, wherein the elastic sealing sheet has a major cross dimension that is greater than the minor cross dimension.

18. The adhesive seal of claim 1, wherein the release sheet has a minor cross dimension that is the same as the minor cross dimension of the elastic sealing sheet.

19. The adhesive seal of claim 1, wherein the release sheet has a major cross dimension that is the same as the major cross dimension of the elastic sealing sheet.

20. The adhesive seal of claim 1, wherein the adhesive layer comprises a homopolymer or copolymer of butyl rubber, styrene-butadiene-styrene, styrene-isoprene-styrene, styrene butadiene, styrene-ethylene-butadiene-styrene, ethylene/vinylacetate, an acrylic homopolymer or copolymer, a methacrylic homopolymer or copolymer, or a combination thereof.

* * * * *